United States Patent
Tzomik et al.

(10) Patent No.: US 11,207,876 B2
(45) Date of Patent: Dec. 28, 2021

(54) FOILING INVOLVING ELECTROSTATIC INKS

(71) Applicant: HP Indigo B.V., Amstelveen (NL)

(72) Inventors: Inna Tzomik, Nes Ziona (IL); Albert Teishev, Nes Ziona (IL); Gil Fisher, Nes Ziona (IL); Gleb Romantcov, Nes Ziona (IL); Faina Kogan, Nes Ziona (IL); Ziv Gilan, Nes Ziona (IL)

(73) Assignee: HP Indigo B.V., Amstelveen (NL)

( * ) Notice: Subject to any disclaimer, the term of this patent is extended or adjusted under 35 U.S.C. 154(b) by 138 days.

(21) Appl. No.: 16/469,049

(22) PCT Filed: Feb. 13, 2017

(86) PCT No.: PCT/EP2017/053165
§ 371 (c)(1),
(2) Date: Jun. 12, 2019

(87) PCT Pub. No.: WO2018/145774
PCT Pub. Date: Aug. 16, 2018

(65) Prior Publication Data
US 2019/0299584 A1    Oct. 3, 2019

(51) Int. Cl.
*B32B 15/04* (2006.01)
*B32B 37/12* (2006.01)
(Continued)

(52) U.S. Cl.
CPC ............. *B32B 38/145* (2013.01); *B32B 7/12* (2013.01); *B32B 15/04* (2013.01);
(Continued)

(58) Field of Classification Search
CPC ....... B29C 65/4895; B32B 7/12; B32B 15/04; B32B 15/08; B32B 15/082; B32B 15/085;
(Continued)

(56) References Cited

U.S. PATENT DOCUMENTS

| 3,519,512 A | 7/1970 | Downs |
| 5,087,495 A | 2/1992 | Nelson |

(Continued)

FOREIGN PATENT DOCUMENTS

| CN | 103507460 | 1/2014 |
| GB | 2210327 | 6/1989 |

(Continued)

OTHER PUBLICATIONS

International Search Report and Written Opinion for International Application No. PCT/EP2017/053165 dated May 29, 2017, 13 pages.

*Primary Examiner* — Michael A Tolin
(74) *Attorney, Agent, or Firm* — Dierker & Kavanaugh PC

(57) ABSTRACT

In an aspect, there is provided a method of foil printing that may comprise providing a substrate having a surface comprising a first area and a second area, wherein the first area has printed thereon a first electrostatic ink composition comprising a first thermoplastic resin and substantially lacking a pigment and the second area has printed thereon a second electrostatic ink composition comprising a second thermoplastic resin and a pigment; applying a liquid solvent composition to the first electrostatic ink composition on the first area and the second electrostatic ink composition on the second area, to swell the first and second thermoplastic resins; and contacting a foiling material with the first electrostatic ink composition on the first area, such that the foiling material selectively adheres to the first area on the surface of the substrate. In another aspect, an electrostatic and foil printing system for performing the method is provided.

14 Claims, 1 Drawing Sheet

(51) Int. Cl.
- *B32B 37/30* (2006.01)
- *B44C 1/175* (2006.01)
- *B32B 38/00* (2006.01)
- *B32B 7/12* (2006.01)
- *G03G 15/10* (2006.01)
- *B44C 1/17* (2006.01)
- *G03G 9/13* (2006.01)
- *G03G 8/00* (2006.01)
- *B32B 37/00* (2006.01)

(52) U.S. Cl.
CPC .......... *B32B 37/0038* (2013.01); *B32B 37/12* (2013.01); *B32B 37/30* (2013.01); *B44C 1/1729* (2013.01); *B44C 1/1756* (2013.01); *G03G 8/00* (2013.01); *G03G 9/13* (2013.01); *G03G 15/10* (2013.01)

(58) Field of Classification Search
CPC ..... B32B 15/12; B32B 15/20; B32B 37/0038; B32B 37/0076; B32B 37/12; B32B 37/1207; B32B 37/30; B32B 38/10; B32B 38/145; B32B 43/006; B44C 1/14; B44C 1/1712; B44C 1/1729; B44C 1/175; B44C 1/1756; G03G 8/00; G03G 9/13; G03G 15/10; G03G 15/6582; G03G 15/6585

See application file for complete search history.

(56) References Cited

U.S. PATENT DOCUMENTS

| | | | |
|---|---|---|---|
| 9,017,802 | B2 | 4/2015 | Ron et al. |
| 9,346,080 | B2 | 5/2016 | Uang |
| 2007/0295448 | A1 | 12/2007 | Mansukhani |
| 2012/0251174 | A1 | 10/2012 | Shirai et al. |
| 2017/0203581 | A1* | 7/2017 | Miwa ................. B41J 2/01 |

FOREIGN PATENT DOCUMENTS

| | | |
|---|---|---|
| WO | WO-03/020519 | 3/2003 |
| WO | WO-2016116141 | 7/2016 |

* cited by examiner

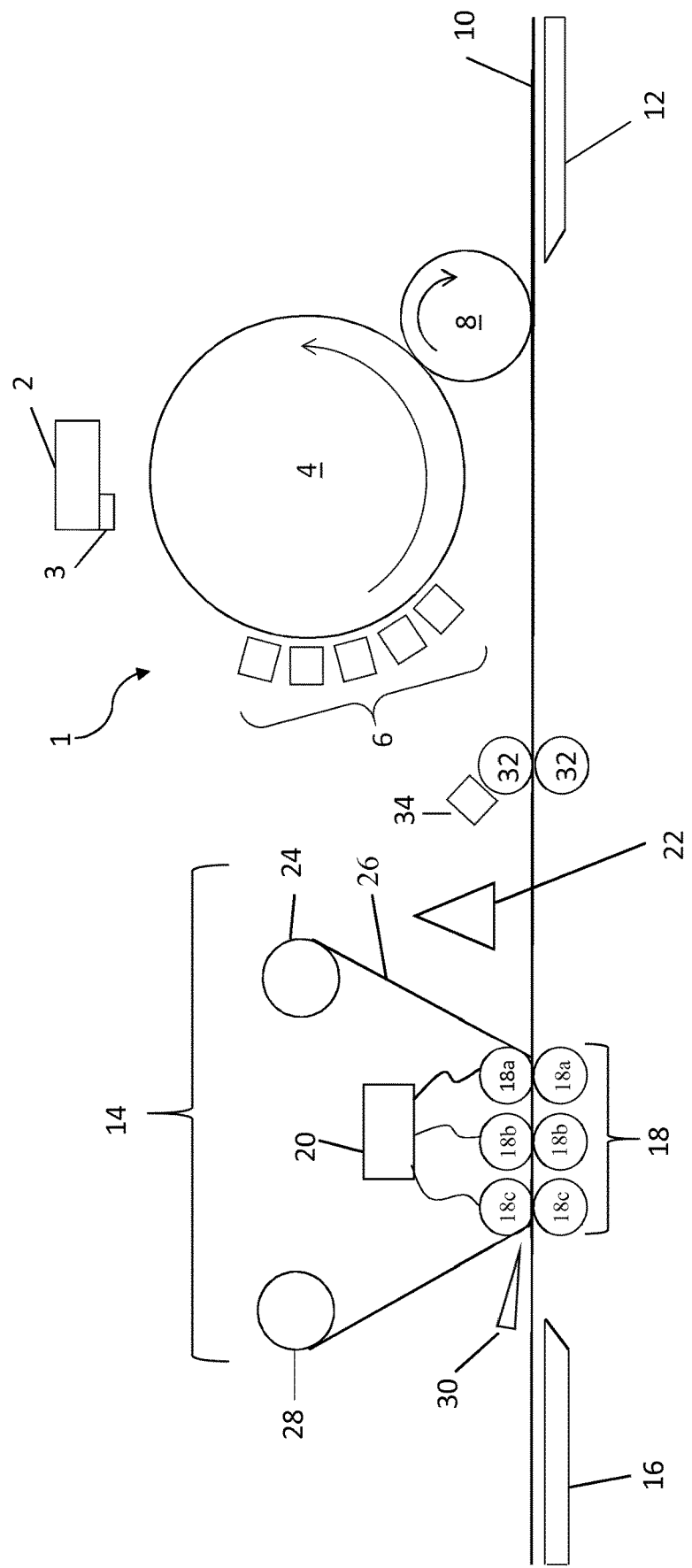

FOILING INVOLVING ELECTROSTATIC INKS

BACKGROUND

Electrophotographic printing processes, sometimes termed electrostatic printing processes, typically involve creating an image on a photoconductive surface, applying a printing composition having charged particles to the photoconductive surface, such that they selectively bind to the image, and then transferring the charged particles in the form of the image to a print substrate.

The photoconductive surface is typically on a cylinder and is often termed a photo-imaging plate (PIP). The photoconductive surface is selectively charged with a latent electrostatic image having image and background areas with different potentials. For example, a printing composition comprising charged toner particles in a carrier liquid can be brought into contact with the selectively charged photoconductive surface. The charged toner particles adhere to the image areas of the latent image while the background areas remain clean. The image is then transferred to a print substrate (e.g., paper) directly or, more commonly, by being first transferred to an intermediate transfer member, which can be a soft swelling blanket, which is often heated to fuse the solid image and evaporate the carrier liquid, and then to the print substrate.

BRIEF DESCRIPTION OF THE FIGURES

FIG. 1 is a schematic illustration of an example of an electrostatic and foil printing system.

DETAILED DESCRIPTION

Before the present disclosure is disclosed and described, it is to be understood that this disclosure is not limited to the particular process steps and materials disclosed herein because such process steps and materials may vary somewhat. It is also to be understood that the terminology used herein is used for the purpose of describing particular embodiments. The terms are not intended to be limiting because the scope is intended to be limited by the appended claims and equivalents thereof.

It is noted that, as used in this specification and the appended claims, the singular forms "a," "an," and "the" include plural referents unless the context clearly dictates otherwise.

As used herein, "carrier fluid", "carrier liquid," "carrier," or "carrier vehicle" refers to the fluid in which the resins, pigment particles (if any), colorant (if any), charge directors and other additives can be dispersed to form a liquid electrostatic composition or electrophotographic composition. The carrier liquids may include a mixture of a variety of different agents, such as surfactants, co-solvents, viscosity modifiers, and/or other possible ingredients.

As used herein, "electrostatic ink composition", when printed on a substrate, generally refers to an ink composition that has been printed on the substrate in an electrostatic printing process, sometimes termed an electrophotographic printing process. The electrostatic ink composition, when printed, may be in the form of a film comprising a resin (e.g. the first or second thermoplastic resin, as described herein). The first electrostatic ink composition, when printed, may be in the form of a film comprising the first thermoplastic resin, and the film substantially lacks a pigment. The second electrostatic ink composition, when printed, may be in the form of a film comprising the second thermoplastic resin having embedded therein the pigment (in the form of pigment particles). Before printing on the substrate, the first and/or second electrostatic ink composition, may have be in the form of a liquid electrostatic ink composition, which may be termed a liquid electrophotographic ink composition, and may be suitable for printing in an electrostatic printing method. The liquid electrostatic ink composition may comprise particles of the thermoplastic resin suspended in a liquid carrier. In the case of the first electrostatic ink composition before printing, the composition may comprise a liquid carrier and particles comprising the first thermoplastic resin, and the liquid carrier and the particles substantially lack a pigment. In the case of the second electrostatic ink composition before printing, the particles comprising the second thermoplastic resin further comprise a pigment, and the particles are suspended in a liquid carrier.

As used herein, "co-polymer" refers to a polymer that is polymerized from at least two monomers.

As used herein, "melt flow rate" generally refers to the extrusion rate of a resin through an orifice of defined dimensions at a specified temperature and load, usually reported as temperature/load, e.g. 190° C./2.16 kg. Flow rates can be used to differentiate grades or provide a measure of degradation of a material as a result of molding. In the present disclosure, "melt flow rate" is measured per ASTM D1238-04c Standard Test Method for Melt Flow Rates of Thermoplastics by Extrusion Plastometer, as known in the art. If a melt flow rate of a particular polymer or copolymer is specified, unless otherwise stated, it is the melt flow rate for that polymer or copolymer alone, in the absence of any of the other components of the LEP printing composition.

As used herein, "acidity," "acid number," or "acid value" refers to the mass of potassium hydroxide (KOH) in milligrams that neutralizes one gram of a substance. The acidity of a polymer or copolymer can be measured according to standard techniques, for example as described in ASTM D1386. If the acidity of a particular polymer or copolymer is specified, unless otherwise stated, it is the acidity for that polymer or copolymer alone, in the absence of any of the other components of the LEP printing composition.

As used herein, "melt viscosity" generally refers to the ratio of shear stress to shear rate at a given shear stress or shear rate. Testing is generally performed using a capillary rheometer. A plastic charge is heated in the rheometer barrel and is forced through a die with a plunger. The plunger is pushed either by a constant force or at constant rate depending on the equipment. Measurements are taken once the system has reached steady-state operation. One method used is measuring Brookfield viscosity @ 140° C., units are mPa-s or cPoise, as known in the art. Alternatively, the melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 Hz shear rate. If the melt viscosity of a particular polymer or copolymer is specified, unless otherwise stated, it is the melt viscosity for that polymer or copolymer alone, in the absence of any of the other components of the LEP printing composition.

If a standard test is mentioned herein, unless otherwise stated, the version of the test to be referred to is the most recent at the time of filing this patent application.

As used herein, "electrostatic printing" or "electrophotographic printing" generally refers to the process that provides an image that is transferred from a photo-imaging substrate either directly or indirectly via an intermediate transfer member to a print substrate. As such, the image is not substantially absorbed into the photo-imaging substrate on which it is applied. Additionally, "electrophotographic printers" or "electrostatic printers" generally refer to those printers capable of performing electrophotographic printing or electrostatic printing, as described above. "Liquid electrophotographic printing" is a specific type of electrophotographic printing where a liquid composition is employed in the electrophotographic process rather than a powder toner. An electrostatic printing process may involve subjecting the electrostatic composition to an electric field, for example, an electric field having a field gradient of 50-400 V/μm, or more, in some examples, 600-900 V/μm, or more.

As used herein, the term "about" is used to provide flexibility to a numerical range endpoint by providing that a given value may be a little above or a little below the endpoint to allow for variation in test methods or apparatus. The degree of flexibility of this term can be dictated by the particular variable and would be within the knowledge of those skilled in the art to determine based on experience and the associated description herein.

As used herein, a plurality of items, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not just the numerical values explicitly recited as the limits of the range, but also to include all the individual numerical values or sub-ranges encompassed within that range as if each numerical value and sub-range is explicitly recited. As an illustration, a numerical range of "about 1 wt. % to about 5 wt. %" should be interpreted to include not just the explicitly recited values of about 1 wt. % to about 5 wt. %, but also include individual values and subranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

As used herein, wt. % values are to be taken as referring to a weight-for-weight (w/w) percentage of solids in the LEP printing composition, and not including the weight of any carrier fluid present.

As used herein, the term "pigment" is used generally to refer to pigment colorants, magnetic particles, aluminas, silicas, and/or other ceramics or organometallics, whether or not such particulates impart colour. Thus, though the present description exemplifies, in some examples, the use of pigment colorants, the term "pigment" can be used more generally to describe not just pigment colorants, but other pigments such as organometallics, ferrites, ceramics, etc.

As used herein, the term "coloured" is used to refer to any colour including white and black.

As used herein, the term "melting point" is used to refer to melting points of the first thermoplastic resin and the second thermoplastic resin. The "melting point" of a first or second thermoplastic resin can be measured by using differential scanning calorimetry and may be determined from the first heat flow minima reached on heating the first or second thermoplastic resin from −50° C. at a rate of 15° C./min. The "melting point" of a first or second thermoplastic resin can be measured by using standard procedures known in the art, for example, using the procedure described in ASTM D3418 or the method outlined in the Examples that follow.

As used herein, the terms "partially molten", "partially melt" and "partially melted" are used to refer to an electrostatic ink composition (once printed) containing a thermoplastic resin in which the thermoplastic resin has been at least partially melted or softened. In the art, this may be determined as when the thermoplastic resin has become tacky. The thermoplastic resin may become partially molten when heated to a temperature approaching the melting point of the thermoplastic resin. For example, an electrostatic ink composition (once printed) comprising a thermoplastic resin may be considered to be at least partially molten when the electrostatic ink composition (once printed) has reached a temperature that is about 20° C. or less below the melting point of the resin. In some examples, the electrostatic ink composition (once printed) is considered to be at least partially molten when the electrostatic ink composition (once printed) has reached a temperature that is about 15° C. or less below the melting point of the resin. In some examples, the electrostatic ink composition (once printed) is considered to be at least partially molten when the electrostatic ink composition (once printed) has reached a temperature that is about 10° C. or less below the melting point of the resin. In some examples, the electrostatic ink composition (once printed) is considered to be at least partially molten when the electrostatic ink composition (once printed) has reached a temperature that is about 5° C. or less below the melting point of the resin component.

In some examples, an electrostatic ink composition (once printed) is considered to be at least partially molten when the electrostatic ink composition (once printed) has been held at a temperature approaching the melting point of the thermoplastic resin for at least 0.5 seconds, in some examples, at least 1 second, in some examples, at least 5 seconds, in some examples, at least 10 seconds.

The skilled person is able to determine the temperature range at which a thermoplastic resin will start to soften or partially melt from data obtained from carrying out differential scanning calorimetry (DSC) on a resin sample by using the procedure described in ASTM D3418 showing heat flow to the sample over a temperature range covering the melting point of the resin. A graph showing the heat flow to the sample against temperature obtained by DSC will show a broad trough for the melting point of the resin. As the skilled person understands, at temperatures below the melting point of the resin, determined as described above, but still within the broad trough the resin will be softened or partially molten.

Unless otherwise stated, any feature described herein can be combined with any aspect or any other feature described herein.

In an aspect, there is provided a method of foil printing. The method of foil printing may comprise:
  providing a substrate having a surface comprising a first area and a second area, wherein the first area has printed thereon a first electrostatic ink composition comprising a first thermoplastic resin and substantially lacking a pigment and the second area has printed thereon a second electrostatic ink composition comprising a second thermoplastic resin and a pigment;

applying a liquid solvent composition to the first electrostatic ink composition on the first area and the second electrostatic ink composition on the second area, to swell the first and second thermoplastic resins; and contacting a foiling material with the first electrostatic ink composition on the first area, such that the foiling material selectively adheres to the first area on the surface of the substrate.

In another aspect, there is provided an electrostatic and foil printing system. The electrostatic and foil printing system may comprise:

an electrostatic printing device, the device, in use, to electrostatically print on a substrate having a surface comprising a first area and a second area, wherein the electrostatic printing device prints on the first area a first electrostatic ink composition comprising a first thermoplastic resin and substantially lacking a pigment and prints on the second area a second electrostatic ink composition comprising a second thermoplastic resin and a pigment;

a component to apply a liquid solvent composition to the first electrostatic ink composition on the first area and the second electrostatic ink composition on the second area, to swell the first and second thermoplastic resins; and a foil printing device, the foil printing device to contact a foiling material with the first electrostatic ink composition on the first area, wherein the foiling material selectively adheres to the first area on the surface of the substrate.

Method of Foil Printing

Described herein is a method of foil printing comprising:

providing a substrate having a surface comprising a first area and a second area, wherein the first area has printed thereon a first electrostatic ink composition comprising a first thermoplastic resin and substantially lacking a pigment and the second area has printed thereon a second electrostatic ink composition comprising a second thermoplastic resin and a pigment;

applying a liquid solvent composition to the first electrostatic ink composition on the first area and the second electrostatic ink composition on the second area, to swell the first and second thermoplastic resins; and contacting a foiling material with the first electrostatic ink composition on the first area, such that the foiling material selectively adheres to the first area on the surface of the substrate.

In some examples, the first area has printed thereon a first electrostatic ink composition and a second electrostatic ink composition, wherein the first electrostatic ink composition forms the surface onto which the liquid solvent composition is applied and to which the foiling material is contacted. In some examples, the method further comprises, as an initial step, electrostatically printing the first and/or second electrostatic ink compositions onto the substrate to provide the substrate having a surface comprising a first area and a second area, wherein the first area has printed thereon the first electrostatic ink composition comprising a first thermoplastic resin and substantially lacking a pigment and the second area has printed thereon the second electrostatic ink composition comprising a second thermoplastic resin and a pigment.

The electrostatic printing may involve creating an image on a photoconductive surface, applying the first or second electrostatic ink composition having charged particles comprising, respectively, the first or second thermoplastic resin, to the photoconductive surface, such that they selectively bind to the image, and then transferring the charged particles in the form of the image to the print substrate to the first or second area, respectively.

The photoconductive surface may be on a cylinder and may be a a photo-imaging plate (PIP). The photoconductive surface may be selectively charged with a latent electrostatic image having image and background areas with different potentials. For example, the first or second electrostatic ink composition comprising charged particles in a carrier liquid can be brought into contact with the selectively charged photoconductive surface. The charged particles adhere to the image areas of the latent image while the background areas remain clean. The image is then transferred to the substrate directly or, in some examples, by being first transferred to an intermediate transfer member, which can be a soft swelling blanket, which may be heated to fuse the solid image and evaporate the carrier liquid, and then to the print substrate.

The application of the liquid solvent composition to the first electrostatic ink composition on the first area and the second electrostatic ink composition on the second area may be achieved by using any suitable technique. In some examples, the application of the liquid solvent composition to the first electrostatic ink composition on the first area and the second electrostatic ink composition on the second area may be achieved by using air knife coating, anilox coating, brush coating, flexography, gravure printing, metering rod coating, pad printing, rod coating, roller coating (e.g., forward roller coating or reverse roller coating), slot die coating (e.g., extrusion coating, curtain coating, slide coating, slot die bead coating, tensioned-web slot die coating), spin coating, spray coating, dip coating, screen printing (e.g., rotary screen coating), inkjet printing, and the like.

The application of the liquid solvent composition may involve offset printing, which may involve transferring the liquid solvent composition from a plate, which may be a flat or a cylindrical plate, to an intermediate transfer member, sometimes termed a blanket, and then to the substrate.

The application of the liquid solvent composition may involve gravure printing, which may involve transferring the liquid solvent composition from an engraved image carrier, for example, a cylinder, to the substrate, optionally via an intermediate transfer member.

The application of the liquid solvent composition may involve flexo printing, sometimes termed flexography, by applying the liquid solvent composition to a flexible relief plate, and then applying this to the substrate to transfer the liquid solvent composition to the substrate.

The application of the liquid solvent composition may involve inkjet printing, which may involve applying the liquid solvent composition by jetting droplets of the liquid solvent composition onto the substrate from nozzles in an inkjet printing device. The inkjet printing may form a pattern or image on the substrate in accordance with a digital pattern or image sent to the printing device. The inkjet printing device may be a drop-on-demand printing device, and may be a thermal ink-jet device or a piezoelectric ink-jet device.

The application of the liquid solvent composition may involve screen printing, which may involve applying the liquid solvent composition via a screen comprising a mesh. In the technique, an elongate member, such as a blade or squeegee, is moved across the screen to fill the apertures of the screen with the liquid solvent composition, which then passes through the apertures to the substrate, optionally on a return sweep of the member across the screen.

The application of the liquid solvent composition may involve pad-printing, which may involve applying the liquid solvent composition by a pad, which may be a silicone pad, optionally in an indirect offset (gravure) printing process.

The application of the liquid solvent composition may involve spray coating, dip-coating, brush coating of the liquid solvent composition on the substrate, which may involve, respectively, spraying the liquid solvent composition onto the substrate, dipping the substrate into the liquid solvent composition and brushing the liquid solvent composition onto the substrate.

The application of the liquid solvent composition may involve air knife coating, which may involve applying the liquid solvent composition to the substrate and then removing the excess by using a powerful jet from the air knife.

The application of the liquid solvent composition may involve anilox coating, which may involve applying the liquid solvent composition to a cylinder containing a plurality (e.g. at least a million) of dimples, known as cells, and then applying this to the substrate to transfer the liquid solvent composition to the substrate The application of the liquid solvent composition may involve metering rod coating/rod coating, which may involve using either a smooth metering rod or a wire wound (mayer) rod to transfer the liquid solvent composition to the substrate.

The application of the liquid solvent composition may involve roller coating (e.g., forward roller coating or reverse roller coating), which may involve the use of a roller to transfer the liquid solvent composition to the substrate.

The application of the liquid solvent composition may involve slot die coating (e.g., extrusion coating, curtain coating, slide coating, slot die bead coating, tensioned-web slot die coating), which may involve the liquid solvent composition passing through a die (e.g., a slit for curtain coating), onto the substrate, in some cases, via an intermediate transfer member.

The application of the liquid solvent composition may involve spin coating, which may involve the liquid solvent composition being applied to the centre of the substrate and the substrate then being spun at a suitable speed in order to spread the liquid solvent composition by centrifugal force.

In some examples, the liquid solvent composition is applied to the first area 5 minutes or less before the foiling material is contacted with the first area. In some examples, the liquid solvent composition is applied to the first area 4 minutes or less, in some examples, 3 minutes or less, in some examples, 2 minutes or less, in some examples, 1.5 minutes or less, in some examples, 1 minute or less, in some examples, 45 seconds or less, in some examples, 30 seconds or less, in some examples, 20 seconds or less, in some examples, 15 seconds or less, in some examples, 10 seconds or less, in some examples, 5 seconds or less, in some examples, 1 second or less, in some examples, 0.5 seconds or less before the foiling material is contacted with the first area. In some examples, the liquid solvent composition is applied to the first area from 0.1 seconds to 5 minutes before the foiling material is contacted with the first area, in some examples 0.5 seconds to 5 minutes, in some examples 0.5 seconds to 4 minutes, in some examples 0.5 seconds to 3 minutes, in some examples 0.5 seconds to 2 minutes, in some examples 0.5 seconds to 1 minute, in some examples 0.5 seconds to 30 seconds.

In some examples, the foiling material contacts both the first and second areas of the surface of the substrate and selectively adheres to the first area of the surface of the substrate and does not adhere to the second area of the surface of the substrate.

In some examples, the liquid solvent composition causes the first thermoplastic resin and the second thermoplastic resin to swell. In some examples, the swelling of the thermoplastic resin with the liquid solvent composition changes the temperature at which the electrostatic ink composition becomes adhesive. In some examples, the swelling of the thermoplastic resin with the liquid solvent composition reduces the temperature at which the electrostatic ink composition becomes adhesive. In some examples, the electrostatic ink composition becomes adhesive when it becomes partially molten.

In some examples, the contacting of the foiling material with the first electrostatic ink composition on the first area, such that the foiling material selectively adheres to the first area on the surface of the substrate, is carried out by a hot foiling technique. A hot foiling technique is carried out at a temperature above room temperature (e.g. above 25° C., in some examples at least 50° C., optionally at least 60° C., optionally at least 70° C., optionally at least 80° C., optionally at least 90° C.) to effect adhesion between a foiling material and a substrate. The hot foiling technique may involve carrying out the method such that the substrate and the foiling material are heated (e.g. to a temperature in the preceding sentence), such that the first thermoplastic resin is softened and tacky (i.e. softer and more adhesive than at room temperature, e.g. 25° C.). In some examples, hot foiling techniques also apply pressure to the foiling material and substrate to effect adhesion between the foiling material and the substrate. In a hot foiling technique, after the application of the foiling material to the substrate, the substrate and foiling material are allowed to cool, such that the first thermoplastic resin hardens and adheres the foiling material to the substrate. In some examples, the hot foiling technique causes the first electrostatic ink on the first area and the second electrostatic ink on the second area to contact the foiling material.

In some examples, the hot foiling technique is performed at a temperature that causes the first thermoplastic resin swollen with the liquid solvent composition to become adhesive without causing the second thermoplastic resin swollen with the liquid solvent composition to become adhesive. In some examples, the hot foiling technique is performed at a temperature that causes the first thermoplastic resin swollen with the liquid solvent composition to partially melt without causing the second thermoplastic resin to partially melt.

In some examples, the swelling of the first thermoplastic resin with the liquid solvent composition reduces the temperature at which the first electrostatic ink composition becomes adhesive more than the swelling of the second thermoplastic resin with the liquid solvent composition reduces the temperature at which the second electrostatic ink composition becomes adhesive. In some examples, the swelling of the first thermoplastic resin with the liquid solvent composition reduces the temperature at which the first electrostatic ink composition becomes partially molten more than the swelling of the second thermoplastic resin with the liquid solvent composition reduces the temperature at which the second electrostatic ink composition becomes partially molten.

In some examples, the first electrostatic ink composition containing the first thermoplastic resin swollen with the liquid solvent composition becomes adhesive at a lower temperature than the second thermoplastic resin swollen with the liquid solvent composition becomes adhesive. In some examples, the first electrostatic ink composition containing the first thermoplastic resin swollen with the liquid solvent composition becomes partially molten at a lower temperature than the second thermoplastic resin swollen with the liquid solvent composition becomes partially molten.

In some examples, the presence of a pigment increases the temperature at which a thermoplastic resin becomes adhesive. In some examples, the presence of a pigment increases the temperature at which a thermoplastic resin becomes partially molten.

In some examples, the presence of a pigment increases the temperature at which a thermoplastic resin swollen with a liquid solvent composition becomes adhesive. In some examples, the presence of a pigment increases the temperature at which a thermoplastic resin swollen with a liquid solvent composition becomes partially molten.

In some examples, the hot foiling technique causes the foiling material to be contacted with the first area at a temperature of 120° C. or less, optionally 115° C. or less, optionally 112° C. or less, optionally 111° C. or less, in some examples, 110° C. or less, in some examples, 105° C. or less. In some examples, the hot foiling technique causes the foiling material to be contacted with the first area at a temperature of 90° C. or more, in some examples, 95° C. or more. In some examples, the hot foiling technique causes the foiling material to be contacted with the first area at a temperature of 90° C. to 120° C., in some examples 90° C. to 115° C., in some examples 90° C. to 110° C., in some examples 95° C. to 105° C.

In some examples, the substrate having a surface comprising a first area and a second area is provided by electrostatically printing a first electrostatic ink composition onto the first area of the substrate and electrostatically printing a second electrostatic ink composition onto the second area of the substrate. In some examples, the substrate having a surface comprising a first area and a second area is provided by liquid electrostatically printing a first liquid electrostatic ink composition onto the first area of the substrate and liquid electrostatically printing a second liquid electrostatic ink composition onto the second area of the substrate.

In some examples, a second electrostatic ink composition is printed on the first area and then a first electrostatic ink composition is printed on the first area. In some examples, a second electrostatic ink composition is printed on the first area, and in some examples the second area, and then a first liquid electrostatic ink composition is printed on the first area over the second electrostatic ink composition.

First Electrostatic Ink Composition

The first electrostatic ink composition comprises a first thermoplastic resin and substantially lacks a pigment. In some examples, the first electrostatic ink composition lacks a pigment. In some examples, the first electrostatic ink composition is a transparent electrostatic ink composition that substantially lacks a pigment. In some examples, the first electrostatic ink composition is a transparent electrostatic ink composition that lacks a pigment.

As used herein, "substantially lacks a pigment" is used to describe a printing composition in which 1 wt. % or less of the solids in the composition are made up of pigment, in some examples, 0.5 wt. % or less of the solids in the composition are made up of pigment, in some examples, 0.1 wt. % or less of the solids in the composition are made up of pigment, in some examples, 0.05 wt. % or less of the solids in the composition are made up of pigment, in some examples, 0.01 wt. % or less of the solids in the composition are made up of pigment.

In some examples, the first thermoplastic resin comprises one thermoplastic resin. In some examples, the first thermoplastic resin comprises a plurality of thermoplastic resins. In some examples, the plurality of thermoplastic resins become adhesive at different temperatures, such that the first electrostatic ink composition becomes adhesive at the lowest temperature at which at least one of the plurality of thermoplastic resins becomes adhesive. In some examples, the plurality of thermoplastic resins partially melt at different temperatures, such that the first electrostatic ink composition partially melts at the lowest temperature at which at least one of the plurality of thermoplastic resins partially melts.

The first thermoplastic resin may comprise a polymer having acidic side groups. In some examples, the polymer is a copolymer of an alkylene monomer and a monomer having an acid side group. In some examples, the alkylene monomer is an ethylene or a propylene monomer. In some examples, the monomer having an acid side group is an acrylic acid monomer or a methacrylic acid monomer. In some examples, the first electrostatic ink composition comprises a polymer resin comprising a copolymer of an alkylene monomer and a monomer selected from acrylic acid and methacrylic acid.

In some examples, the first thermoplastic resin may comprise a terpolymer of ethylene, an acrylic ester and maleic anhydride. In some examples, the first thermoplastic resin may comprise a terpolymer of ethylene, methyl acrylate and maleic anhydride. In some examples, the terpolymer of ethylene, an acrylic ester (e.g., methyl acrylate) and maleic anhydride may comprise 5 wt. % or more, in some examples, 10 wt. % or more, in some examples, 12 wt. % or more acryl ester (e.g., methyl acrylate). In some examples, the terpolymer of ethylene, an acrylic ester (e.g., methyl acrylate) and maleic anhydride may comprise 25 wt. % or less, in some examples, 20 wt. % or less, in some examples, 18 wt. % or less acrylic ester (e.g., methyl acrylate). In some examples, the terpolymer of ethylene, an acrylic ester (e.g., methyl acrylate) and maleic anhydride may comprise 5 wt. % to 25 wt. %, in some examples, 10 wt. % to 20 wt. %, in some examples, 12 wt. % to 18 wt. % acrylic ester (e.g., methyl acrylate). In some examples, the terpolymer of ethylene, methyl acrylate and maleic anhydride may comprise 15 wt. % acrylic ester (e.g., methyl acrylate). In some examples, the terpolymer of ethylene, an acrylic ester (e.g., methyl acrylate) and maleic anhydride may comprise 1 wt. % or more, in some examples, 2 wt. % or more, in some examples, 3 wt. % or more maleic anhydride. In some examples, the terpolymer of ethylene, an acrylic ester (e.g., methyl acrylate) and maleic anhydride may comprise 6 wt. % or less, in some examples, 5 wt. % or less, in some examples, 4 wt. % or less maleic anhydride. In some examples, the terpolymer of ethylene, an acrylic ester (e.g., methyl acrylate) and maleic anhydride may comprise 1 wt. % to 6 wt. %, in some examples, 2 wt. % to 5 wt. %, in some examples, 3 wt. % to 4 wt. % maleic anhydride. In some examples, the terpolymer of ethylene, an acrylic ester (e.g., methyl acrylate) and maleic anhydride may comprise 3.1 wt. % maleic anhydride. In some examples, the remaining weight percent may comprise ethylene. In some examples, the terpolymer of ethylene, an acrylic ester (e.g., methyl acrylate) and maleic anhydride may comprise 5 wt. % to 25 wt. %, in some examples, 10 wt. % to 20 wt. %, in some examples, 12 wt. % to 18 wt. % acrylic ester (e.g., methyl acrylate) and 1 wt. % to 6 wt. %, in some examples, 2 wt. % to 5 wt. %, in some examples, 3 wt. % to 4 wt. % maleic anhydride, with the remaining weight percent comprising ethylene. In some examples, the terpolymer of ethylene, methyl acrylate and maleic anhydride may be Lotader 3430.

In some examples, the first thermoplastic resin may comprise an ethylene-vinyl acetate copolymer. In some examples, the vinyl acetate monomer may constitute 10 wt. % to 40 wt. % of the ethylene-vinyl acetate copolymer, in some examples, 15 wt. % to 35 wt. %, in some examples, 20 wt. % to 35 wt. %, in some examples, 25 wt. % to 30 wt. %, in some examples, about 28 wt. % of the ethylene-vinyl acetate copolymer. In some examples, the ethylene-vinyl acetate copolymer may be Elvax 250. In some examples, the ethylene-vinyl acetate copolymer constitutes 60 wt. % or more of the first thermoplastic resin. In some examples, the ethylene-vinyl acetate copolymer constitutes 65 wt. % or more of the first thermoplastic resin, in some examples, 70 wt. % or more of the first thermoplastic resin, in some examples, 75 wt. % or more of the first thermoplastic resin. In some examples, the ethylene-vinyl acetate copolymer constitutes 95 wt. % or less of the first thermoplastic resin, in some examples, 90 wt. % or less of the first thermoplastic resin, in some examples, 85 wt. % or less of the first thermoplastic resin. In some examples, the ethylene-vinyl acetate copolymer constitutes 65 wt. % to 95 wt. %, in some examples, 70 wt. % to 90 wt. %, in some examples, 75 wt. % to 85 wt. % of the first thermoplastic resin. In some examples, the ethylene-vinyl acetate copolymer constitutes 80 wt. % of the first thermoplastic resin. In some examples, the first thermoplastic resin may comprise an ethylene-vinyl acetate copolymer and a polymer having acidic side groups. In some examples, the first thermoplastic resin comprises an ethylene-vinyl acetate copolymer and a copolymer of ethylene and a monomer selected from methacrylic acid acrylic acid, wherein the copolymer of ethylene and a monomer selected from methacrylic acid and acrylic acid may be as described below. In some examples, the first thermoplastic resin comprises an ethylene-vinyl acetate copolymer, a copolymer of ethylene and methacrylic acid and a copolymer of ethylene and acrylic acid, wherein the copolymer of ethylene and methacrylic acid and the copolymer of ethylene and acrylic acid may be as described below.

In some examples, the first electrostatic ink composition further comprises (in addition to the resin) a solid polar compound, which may be defined a compound that is a solid (e.g., at room temperature, i.e., from about 20° C. to about 25° C.), colorless organic material. The solid organic material may be a polymeric material or a non-polymeric material. The solid polar compound may be selected from saccharides (i.e., carbohydrates), polyacrylic acid, polyvinyl alcohol, styrene maleic anhydride, cellulose derivatives, bismaleimide oligomers, and aliphatic urethane acrylates. The saccharides/carbohydrates may be selected from maltose monohydrate, sucrose, sucrose octanoate, sucrose octaacetate, dextrin, xylitol, and sucrose benzoate. Examples of commercially available styrene maleic anhydrides include copolymers from Sartomer Co. USA, LLC, such as SMA® 40001, SMA® 10001, and SMA® 1000P. Examples of cellulose derivatives include sodium carboxylmethyl cellulose and cellulose acetate propionate. A suitable example of a bismaleimide oligomer is bis-stearamide, and a suitable example of an aliphatic urethane acrylate is REAFREE® UV ND-2335 from Arkema, Spain.

In some examples, the first electrostatic ink composition, before being printed on the substrate, is a dry toner composition. In some examples, the first electrostatic ink composition, before being printed on the substrate, is a liquid electrostatic ink composition.

In some examples, the first electrostatic ink composition, before being printed on the substrate, comprises a first thermoplastic resin and a carrier liquid. In some examples, the first electrostatic ink composition, before being printed on the substrate, comprises a first thermoplastic resin, a carrier liquid and a charge adjuvant, and, when printed, all of these components may be present in the first electrostatic ink composition, except the carrier liquid. In some examples, the first electrostatic ink composition, before being printed on the substrate, comprises a first thermoplastic resin, a carrier liquid, a charge adjuvant and a charge director, and, when printed, all of these components may be present in the first electrostatic ink composition, except the carrier liquid. In some examples, the first electrostatic ink composition may include an additive or a plurality of additives.

In some examples, the first thermoplastic resin may constitute 50% to 99% by weight of the solids in the first electrostatic ink composition, in some examples, 60% to 99% by weight of the solids of the first electrostatic ink composition, in some examples, 70% to 95% by weight of the solids of the first electrostatic ink composition, in some examples, 80% to 90% by weight of the solids of the first electrostatic ink composition. The remaining wt. % of the solids in the first electrostatic ink composition may be any additives that may be present.

The additives or plurality of additives may constitute 20 wt. % or less, in some examples, 15 wt. % or less, in some examples, 10 wt. % or less of the solids of the first electrostatic ink composition, in some examples, 5 wt. % or less of the solids of the first electrostatic ink composition, in some examples, 3 wt. % or less of the solids of the first electrostatic ink composition, in some examples, 1 wt. % or less of the solids of the first electrostatic ink composition.

In some examples, the first electrostatic ink composition may include a slip agent. In some examples, the slip agent is an agent which, after printing of the first electrostatic ink composition, effects a decrease over time of the coefficient of friction of the printed electrostatic ink composition. In some examples, the slip agent is a non-ionic compound. In some examples, the slip agent is selected from: (a) esters, amides, alcohols and acids of oils, which may be selected from aromatic or aliphatic hydrocarbon oils, which may be selected from mineral oils, naphthenic oils and paraffinic oils; natural oils such as castor, corn, cottonseed, olive, rapeseed, soybean, sunflower, other vegetable and animal oils, and so on; and functionalized derivatives of these oils, which may be selected from, for example, polyol esters of monocarboxylic acids such as glycerol monostearate, pentaerythritol monooleate, saturated and unsaturated fatty acid amides or ethylenebis(amides), such as oleamide, erucamide, linoleamide, and mixtures thereof, glycols, polyether polyols like Carbowax, and adipic acid and sebacic acid; (b) fluoro-containing polymers such as polytetrafluoroethylene, fluorine oils, fluorine waxes and so forth; and (c) silicon compounds such as silanes and silicone polymers, including silicone oils, polydimethylsiloxane, and amino-modified polydimethylsiloxane.

In some examples, the slip agent is selected from a fatty amide and a castor oil derivative.

In some examples, the slip agent may be selected from stearamidoethylstearamide, stearamidoethylpalmitamide, palmitamidoethylstearamide, ethylenebisstearamide, ethylenebisoleamide, stearylerucamide, erucamidoethylerucamide, oleamidoethyl-oleamide, erucamidoethyloleamide, oleamidoethylerucamide, stearamidoethyl-erucamide, erucamidoethylpalmitamide, palmitamidoethyloleamide and erucamide. Examples of commercially available slip agents include Finawax C, Finawax VL and Finawax E, all of which are available from Fine Organics, India.

In some examples, the slip agent may constitute 9 wt. % or less, in some examples, 8 wt. % or less, in some examples, 7 wt. % or less, in some examples, 6 wt. % or less of the total amount of resins and slip agent in the electrostatic ink composition. In some examples, the slip agent may constitute 1 wt. % or more, in some examples, 2 wt. % or more, in some examples, 3 wt. % or more, in some examples, 4 wt. % or more of the total amount of resins and slip constitute in the electrostatic ink composition. In some examples, the slip agent may comprise 1 wt. % to 9 wt. %, in some examples, 2 wt. % to 8 wt. %, in some examples, 3 wt. % to 7 wt. %, in some examples, 4 wt. % to 6 wt. % of the total amount of resins and slip agent in the electrostatic ink composition. In some examples, the slip agent may constitute 5 wt. % of the total amount of resins and slip in the electrostatic ink composition.

Second Electrostatic Ink Composition

The second electrostatic ink composition comprises a second thermoplastic resin and a pigment.

In some examples, the pigment constitutes a certain wt. %, for example, from 1 wt. %, to 60 wt. % of the solids of the second electrostatic ink composition, and the remaining wt. % of the solids of the electrostatic ink composition is formed by the second thermoplastic resin and, in some examples, any other additives that are present.

The pigment may be present in the second electrostatic ink composition in an amount of from 10 wt. % to 80 wt. % of the total amount of the second thermoplastic resin and pigment, in some examples, 15 wt. % to 80 wt. %, in some examples, 15 wt. % to 60 wt. %, in some examples, 15 wt. % to 50 wt. %, in some examples, 15 wt. % to 40 wt. %, in some examples, 15 wt. % to 30 wt. % of the total amount of the second thermoplastic resin and pigment. In some examples, the pigment may be present in the second electrostatic ink composition in an amount of at least 50 wt. % of the total amount of the second thermoplastic resin and pigment, for example, at least 55 wt. % of the total amount of the second thermoplastic resin and pigment.

In some examples, the second thermoplastic resin may constitute 5% to 99% by weight of the solids in the second electrostatic ink composition, in some examples, 50% to 90% by weight of the solids of the second electrostatic ink composition, in some examples, 70% to 90% by weight of the solids of the second electrostatic ink composition. The remaining wt. % of the solids in the ink composition may be a pigment and, in some examples, any additives that may be present.

The additives may constitute 10 wt. % or less of the solids of the second electrostatic ink composition, in some examples, 5 wt. % or less of the solids of the second electrostatic ink composition, in some examples, 3 wt. % or less of the solids of the second electrostatic ink composition.

In some examples, the second thermoplastic resin comprises one thermoplastic resin. In some examples, the second thermoplastic resin comprises a plurality of thermoplastic resins. In some examples, the plurality of thermoplastic resins become adhesive at different temperatures, such that the second electrostatic ink composition becomes adhesive at the lowest temperature at which at least one of the plurality of thermoplastic resins becomes adhesive. In some examples, the plurality of thermoplastic resins partially melt at different temperatures, such that the second electrostatic ink composition partially melts at the lowest temperature at which at least one of the plurality of thermoplastic resins partially melts.

In some examples, the second thermoplastic resin may comprise a polymer having acidic side groups. In some examples, the polymer is a copolymer of an alkylene monomer and a monomer having an acid side group. In some examples, the alkylene monomer is an ethylene or a propylene monomer. In some examples, the monomer having an acid side group is an acrylic acid monomer or a methacrylic acid monomer. In some examples, the second electrostatic ink composition comprises a polymer resin comprising a copolymer of an alkylene monomer and a monomer selected from acrylic acid and methacrylic acid.

In some examples, the second electrostatic ink composition, before being printed on the substrate, is a dry toner composition. In some examples, the second electrostatic ink composition, before being printed on the substrate, is a liquid electrostatic ink composition.

In some examples, the second electrostatic ink composition, before being printed on the substrate, comprises a second thermoplastic resin, a pigment and a carrier liquid. In some examples, the second electrostatic ink composition, before being printed on the substrate, comprises a second thermoplastic resin, a pigment, a carrier liquid and a charge adjuvant, and, when printed, all of these components may be present in the first electrostatic ink composition, except the carrier liquid. In some examples, the second electrostatic ink composition, before being printed on the substrate, comprises a second thermoplastic resin, a pigment, a carrier liquid, a charge adjuvant and a charge director, and, when printed, all of these components may be present in the first electrostatic ink composition, except the carrier liquid. In some examples, the second electrostatic ink composition, before being printed on the substrate, may include an additive or a plurality of additives, and, when printed, all of these components may be present in the first electrostatic ink composition, except the carrier liquid.

In some examples, in the second electrostatic composition before printing, the second thermoplastic resin coats the pigment. In some examples, in the second electrostatic composition before printing, the second thermoplastic resin coats the pigment such that particles are formed having a core of pigment and an outer layer of the second thermoplastic resin thereon. The outer layer of second thermoplastic resin may coat the pigment partially or completely.

In some examples, the second electrostatic ink composition before printing on the substrate, may comprise particles comprising a pigment and a second thermoplastic resin.

Thermoplastic Resins

In some examples, the first thermoplastic resin may be the same as the second thermoplastic resin. In some examples, the first thermoplastic resin may be different from the second thermoplastic resin.

A thermoplastic resin is sometimes referred to as a thermoplastic polymer or simply as a resin. The thermoplastic resins which may be used as the first and/or second thermoplastic resins are discussed below.

The resin typically includes a polymer. In some examples, the polymer of the resin may be selected from ethylene acrylic acid copolymers; ethylene methacrylic acid copolymers; ethylene vinyl acetate copolymers; copolymers of ethylene (e.g. 80 wt. % to 99.9 wt. %) and alkyl (e.g. C1 to C5) ester of methacrylic or acrylic acid (e.g. 0.1 wt. % to 20 wt. %); copolymers of ethylene (e.g. 80 wt. % to 99.9 wt. %), acrylic or methacrylic acid (e.g. 0.1 wt. % to 20.0 wt. %) and alkyl (e.g. C1 to C5) ester of methacrylic or acrylic acid (e.g. 0.1 wt. % to 20 wt. %); polyethylene; polystyrene; isotactic polypropylene (crystalline); ethylene ethyl acrylate; polyesters; polyvinyl toluene; polyamides; styrene/butadiene copolymers; epoxy resins; acrylic resins (e.g. copolymer of acrylic or methacrylic acid and at least one alkyl ester of acrylic or methacrylic acid wherein alkyl is, in some examples, from 1 to about 20 carbon atoms, such as methyl methacrylate (e.g. 50 wt. % to 90 wt. %)/methacrylic acid (e.g. 0 wt. % to 20 wt. %)/ethylhexylacrylate (e.g. 10 wt. % to 50 wt. %)); ethylene-acrylate terpolymers: ethylene-acrylic esters-maleic anhydride (MAH) or glycidyl methacrylate (GMA) terpolymers; ethylene-acrylic acid ionomers and combinations thereof.

In some examples, the polymer is a copolymer of an alkylene monomer and a monomer having an acid side group. In some examples, the alkylene monomer is an ethylene or a propylene monomer. In some examples, the monomer having an acid side group is an acrylic acid monomer or a methacrylic acid monomer. In some examples, the electrostatic ink composition comprises a polymer resin comprising a copolymer of an alkylene monomer and a monomer selected from acrylic acid and methacrylic acid.

The resin may comprise a polymer having acidic side groups. The polymer having acidic side groups may have an acidity of 50 mg KOH/g or more, in some examples, an acidity of 60 mg KOH/g or more, in some examples, an acidity of 70 mg KOH/g or more, in some examples, an acidity of 80 mg KOH/g or more, in some examples, an acidity of 90 mg KOH/g or more, in some examples, an acidity of 100 mg KOH/g or more, in some examples, an acidity of 105 mg KOH/g or more, in some examples, 110 mg KOH/g or more, in some examples, 115 mg KOH/g or more. The polymer having acidic side groups may have an acidity of 200 mg KOH/g or less, in some examples, 190 mg or less, in some examples, 180 mg or less, in some examples, 130 mg KOH/g or less, in some examples, 120 mg KOH/g or less. Acidity of a polymer, as measured in mg KOH/g can be measured by using standard procedures, for example, by using the procedure described in ASTM D1386.

The resin may comprise a polymer, in some examples, a polymer having acidic side groups, that has a melt flow rate of about 60 g/10 minutes or less, in some examples, about 50 g/10 minutes or less, in some examples, about 40 g/10 minutes or less, in some examples, 30 g/10 minutes or less, in some examples, 20 g/10 minutes or less, in some examples, 10 g/10 minutes or less. In some examples, all polymers having acidic side groups and/or ester groups in the particles each individually have a melt flow rate of 90 g/10 minutes or less, 80 g/10 minutes or less, in some examples, 80 g/10 minutes or less, in some examples, 70 g/10 minutes or less, in some examples, 60 g/10 minutes or less.

The polymer having acidic side groups can have a melt flow rate of about 10 g/10 minutes to about 120 g/10 minutes, in some examples, about 10 g/10 minutes to about 70 g/10 minutes, in some examples, about 10 g/10 minutes to 40 g/10 minutes, in some examples, 20 g/10 minutes to 30 g/10 minutes. The polymer having acidic side groups can have a melt flow rate of, in some examples, about 50 g/10 minutes to about 120 g/10 minutes, in some examples, 60 g/10 minutes to about 100 g/10 minutes.

In some examples, the polymer having acid side groups has a melt flow rate of about 120 g/10 minutes or more, in some examples, about 200 g/10 minutes or more, in some examples, about 300 g/10 minutes or more, in some examples, about 400 g/10 minutes or more. In some examples, the polymer having acid side groups has a melt flow rate of about 450 g/10 minutes.

In some examples, the polymer having acid side groups has a melt flow rate of about 500 g/10 minutes or less.

In some examples, the polymer having acid side groups has a melt flow rate in the range of about 150 g/10 minutes to about 600 g/10 minutes. In some examples, the polymer having acid side groups has a melt flow rate in the range of about 200 g/10 minutes to about 500 g/10 minutes.

In some examples, the polymer having acid side groups constitutes 50 wt. % or more of the resin, in some examples, 60 wt. % or more, in some examples, 80 wt. % or more, in some examples, 90 wt. % or more. In some examples, the polymer having acid side groups has a melt flow rate of about 200 g/10 minutes or more, in some examples, a melt flow rate of about 200 g/10 minutes or more and up to about 500 g/10 minutes, and constitutes 50 wt. % or more of the resin, in some examples, 60 wt. % or more, in some examples, 80 wt. % or more, in some examples, 90 wt. % or more.

The melt flow rate can be measured by using standard procedures, for example, as described in ASTM D1238.

The acidic side groups may be in free acid form or may be in the form of an anion and associated with one or more counterions, generally metal counterions, for example, a metal selected from the alkali metals, such as lithium, sodium and potassium, alkali earth metals, such as magnesium or calcium, and transition metals, such as zinc. The polymer having acidic side groups can be selected from resins such as copolymers of ethylene and an ethylenically unsaturated acid of either acrylic acid or methacrylic acid; and ionomers thereof, such as methacrylic acid and ethylene-acrylic or methacrylic acid copolymers which are at least partially neutralized with metal ions (e.g., Zn, Na, Li), such as SURLYN® ionomers. The polymer comprising acidic side groups can be a copolymer of ethylene and an ethylenically unsaturated acid of either acrylic or methacrylic acid, where the ethylenically unsaturated acid of either acrylic or methacrylic acid constitutes from 5 wt. % to about 25 wt. % of the copolymer, in some examples, from 10 wt. % to about 20 wt. % of the copolymer.

The resin may comprise two different polymers having acidic side groups. The two polymers having acidic side groups may have different acidities, which may fall within the ranges mentioned above. The resin may comprise a first polymer having acidic side groups that has an acidity of from 50 mg KOH/g to 110 mg KOH/g and a second polymer having acidic side groups that has an acidity of 110 mg KOH/g to 130 mg KOH/g.

The resin may comprise two different polymers having acidic side groups: a first polymer having acidic side groups that has a melt flow rate of about 10 g/10 minutes to about 50 g/10 minutes and an acidity of from 50 mg KOH/g to 110 mg KOH/g, and a second polymer having acidic side groups that has a melt flow rate of about 50 g/10 minutes to about 120 g/10 minutes and an acidity of 110 mg KOH/g to 130 mg KOH/g. The first and second polymers may be absent of ester groups.

The resin may comprise two different polymers having acidic side groups: a first polymer that is a copolymer of ethylene (e.g. 92 to 85 wt. %, in some examples, about 89 wt. %) and acrylic or methacrylic acid (e.g. 8 to 15 wt. %, in some examples, about 11 wt. %) having a melt flow rate of 80 to 110 g/10 minutes and a second polymer that is a co-polymer of ethylene (e.g. about 80 to 92 wt. %, in some examples, about 85 wt. %) and acrylic acid (e.g. about 20 to 8 wt. %, in some examples, about 15 wt. %), having a melt viscosity lower than that of the first polymer, the second polymer for example, having a melt viscosity of 15000 poise or less, in some examples, a melt viscosity of 10000 poise or less, in some examples, 1000 poise or less, in some examples, 100 poise or less, in some examples, 50 poise or less, in some examples, 10 poise or less. Melt viscosity can be measured by using standard techniques. The melt viscosity can be measured by using a rheometer, for example, a commercially available AR-2000 Rheometer from Thermal Analysis Instruments, using the geometry of: 25 mm steel plate-standard steel parallel plate, and finding the plate over plate rheometry isotherm at 120° C., 0.01 Hz shear rate.

In any of the resins mentioned above, the ratio of the first polymer having acidic side groups to the second polymer having acidic side groups can be from about 10:1 to about 2:1. In another example, the ratio can be from about 6:1 to about 3:1, in some examples, about 4:1.

The resin may comprise a polymer having a melt viscosity of 15000 poise or less, in some examples, a melt viscosity of 10000 poise or less, in some examples, 1000 poise or less, in some examples, 100 poise or less, in some examples, 50 poise or less, in some examples, 10 poise or less; said polymer may be a polymer having acidic side groups as described herein. The resin may comprise a first polymer having a melt viscosity of 15000 poise or more, in some examples, 20000 poise or more, in some examples, 50000 poise or more, in some examples, 70000 poise or more; and in some examples, the resin may comprise a second polymer having a melt viscosity less than the first polymer, in some examples, a melt viscosity of 15000 poise or less, in some examples, a melt viscosity of 10000 poise or less, in some examples, 1000 poise or less, in some examples, 100 poise or less, in some examples, 50 poise or less, in some examples, 10 poise or less. The resin may comprise a first polymer having a melt viscosity of 60000 poise or more, in some examples, from 60000 poise to 100000 poise, in some examples, from 65000 poise to 85000 poise; a second polymer having a melt viscosity of from 15000 poise to 40000 poise, in some examples, 20000 poise to 30000 poise, and a third polymer having a melt viscosity of 15000 poise or less, in some examples, a melt viscosity of 10000 poise or less, in some examples, 1000 poise or less, in some examples, 100 poise or less, in some examples, 50 poise or less, in some examples, 10 poise or less; an example of the first polymer is Nucrel 960 (from DuPont), and an example of the second polymer is Nucrel 699 (from DuPont), and an example of the third polymer is AC-5120 (from Honeywell). The first, second and third polymers may be polymers having acidic side groups as described herein. The melt viscosity can be measured by using a rheometer, for example, a commercially available AR-2000 Rheometer from Thermal Analysis Instruments, using the geometry of: 25 mm steel plate-standard steel parallel plate, and finding the plate over plate rheometry isotherm at 120° C., 0.01 Hz shear rate.

If the resin comprises a single type of resin polymer, the resin polymer (excluding any other components of the electrostatic ink composition) may have a melt viscosity of 6000 poise or more, in some examples, a melt viscosity of 8000 poise or more, in some examples, a melt viscosity of 10000 poise or more, in some examples, a melt viscosity of 12000 poise or more. If the resin comprises a plurality of polymers all the polymers of the resin may together form a mixture (excluding any other components of the electrostatic ink composition) that has a melt viscosity of 6000 poise or more, in some examples, a melt viscosity of 8000 poise or more, in some examples, a melt viscosity of 10000 poise or more, in some examples, a melt viscosity of 12000 poise or more. Melt viscosity can be measured by using standard techniques. The melt viscosity can be measured by using a rheometer, for example, a commercially available AR-2000 Rheometer from Thermal Analysis Instruments, using the geometry of: 25 mm steel plate-standard steel parallel plate, and finding the plate over plate rheometry isotherm at 120° C., 0.01 Hz shear rate.

The resin may comprise two different polymers having acidic side groups that are selected from copolymers of ethylene and an ethylenically unsaturated acid of either methacrylic acid or acrylic acid; and ionomers thereof, such as methacrylic acid and ethylene-acrylic or methacrylic acid copolymers which are at least partially neutralized with metal ions (e.g. Zn, Na, Li), such as SURLYN® ionomers. The resin may comprise (i) a first polymer that is a copolymer of ethylene and an ethylenically unsaturated acid of either acrylic acid or methacrylic acid, wherein the ethylenically unsaturated acid of either acrylic or methacrylic acid constitutes from about 8 wt. % to about 16 wt. % of the copolymer, in some examples, about 10 wt. % to about 16 wt. % of the copolymer; and (ii) a second polymer that is a copolymer of ethylene and an ethylenically unsaturated acid of either acrylic acid and methacrylic acid, wherein the ethylenically unsaturated acid of either acrylic or methacrylic acid constitutes from about 12 wt. % to about 30 wt. % of the copolymer, in some examples, from about 14 wt. % to about 20 wt. % of the copolymer, in some examples, from about 16 wt. % to about 20 wt. % of the copolymer, in some examples, from about 17 wt. % to about 19 wt. % of the copolymer.

In some examples, the resin essentially consists of a copolymer of ethylene and methacrylic acid. In some examples, the methacrylic acid of the copolymer of ethylene and methacrylic acid constitutes about 8 wt. % to about 12 wt. % of the copolymer, in some examples, about 9 wt. % to about 11 wt. % of the copolymer, in some examples, about 10 wt. % of the copolymer.

In an example, the resin constitutes about 5% to about 90%, in some examples, about 5% to about 80%, by weight of the solids of the electrostatic ink composition. In another example, the resin constitutes about 10% to about 60% by weight of the solids of the electrostatic ink composition. In another example, the resin constitutes about 15% to about 40% by weight of the solids of the electrostatic ink composition. In another example, the resin constitutes about 60% to about 95% by weight, in some examples, from about 80% to about 90% by weight of the solids of the electrostatic ink composition.

The resin may comprise a polymer having acidic side groups, as described above (which may be free of ester side groups), and a polymer having ester side groups. The polymer having ester side groups is, in some examples, a thermoplastic polymer. The polymer having ester side groups may further comprise acidic side groups. The polymer having ester side groups may be a co-polymer of a monomer having ester side groups and a monomer having acidic side groups. The polymer may be a co-polymer of a monomer having ester side groups, a monomer having acidic side groups, and a monomer absent of any acidic and ester side groups. The monomer having ester side groups may be a monomer selected from esterified acrylic acid or esterified methacrylic acid. The monomer having acidic side groups may be a monomer selected from acrylic or methacrylic acid. The monomer absent of any acidic and ester side groups may be an alkylene monomer, including, for example, ethylene or propylene. The esterified acrylic acid or esterified methacrylic acid may, respectively, be an alkyl ester of acrylic acid or an alkyl ester of methacrylic acid. The alkyl group in the alkyl ester of acrylic or methacrylic acid may be an alkyl group having 1 to 30 carbon atoms, in some examples, 1 to 20 carbon atoms, in some examples, 1 to 10 carbon atoms; in some examples, selected from methyl, ethyl, iso-propyl, n-propyl, t-butyl, iso-butyl, n-butyl and pentyl.

The polymer having ester side groups may be a co-polymer of a first monomer having ester side groups, a second monomer having acidic side groups and a third monomer which is an alkylene monomer absent of any acidic and ester side groups. The polymer having ester side groups may be a co-polymer of (i) a first monomer having ester side groups selected from esterified acrylic acid or esterified methacrylic acid, in some examples, an alkyl ester of acrylic or methacrylic acid, (ii) a second monomer having acidic side groups selected from acrylic or methacrylic acid and (iii) a third monomer which is an alkylene monomer selected from ethylene and propylene. The first monomer may constitute about 1% to about 50% by weight of the co-polymer, in some examples, about 5% to about 40% by weight, in some examples, about 5% to about 20% by weight of the copolymer, in some examples, about 5% to about 15% by weight of the copolymer. The second monomer may constitute about 1% to about 50% by weight of the co-polymer, in some examples, about 5% to about 40% by weight of the co-polymer, in some examples, about 5% to about 20% by weight of the co-polymer, in some examples, about 5% to about 15% by weight of the copolymer. In an example, the first monomer constitutes about 5% to about 40% by weight of the co-polymer and the second monomer constitutes about 5% to about 40% by weight of the co-polymer, with the third monomer constituting the remaining weight of the copolymer. In an example, the first monomer constitutes about 5% to about 15% by weight of the co-polymer and the second monomer constitutes about 5% to about 15% by weight of the co-polymer, with the third monomer constituting the remaining weight of the copolymer. In an example, the first monomer constitutes about 8% to about 12% by weight of the co-polymer and the second monomer constitutes about 8% to about 12% by weight of the co-polymer, with the third monomer constituting the remaining weight of the copolymer. In an example, the first monomer constitutes about 10% by weight of the co-polymer and the second monomer constitutes about 10% by weight of the co-polymer, with the third monomer constituting the remaining weight of the copolymer. The polymer having ester side groups may be selected from the Bynel® class of monomer, including Bynel 2022 and Bynel 2002, which are available from DuPont®.

The polymer having ester side groups may constitute about 1% or more by weight of the total amount of the resin polymers in the resin, for example, the total amount of the polymer or polymers having acidic side groups and polymer having ester side groups. The polymer having ester side groups may constitute about 5% or more by weight of the total amount of the resin polymers in the resin, in some examples, about 8% or more by weight of the total amount of the resin polymers in the resin, in some examples, about 10% or more by weight of the total amount of the resin polymers in the resin, in some examples, about 15% or more by weight of the total amount of the resin polymers in the resin, in some examples, about 20% or more by weight of the total amount of the resin polymers in the resin, in some examples, about 25% or more by weight of the total amount of the resin polymers in the resin, in some examples, about 30% or more by weight of the total amount of the resin polymers in the resin, in some examples, about 35% or more by weight of the total amount of the resin polymers in the resin. The polymer having ester side groups may constitute from about 5% to about 50% by weight of the total amount of the resin polymers in the resin, in some examples, about 10% to about 40% by weight of the total amount of the resin polymers in the resin, in some examples, about 15% to about 30% by weight of the total amount of the polymers in the resin.

The polymer having ester side groups may have an acidity of 50 mg KOH/g or more, in some examples, an acidity of about 60 mg KOH/g or more, in some examples, an acidity of about 70 mg KOH/g or more, in some examples, an acidity of about 80 mg KOH/g or more. The polymer having ester side groups may have an acidity of about 100 mg KOH/g or less, in some examples, about 90 mg KOH/g or less. The polymer having ester side groups may have an acidity of about 60 mg KOH/g to about 90 mg KOH/g, in some examples, about 70 mg KOH/g to about 80 mg KOH/g.

The polymer having ester side groups may have a melt flow rate of about 10 g/10 minutes to about 120 g/10 minutes, in some examples, about 10 g/10 minutes to about 50 g/10 minutes, in some examples, about 20 g/10 minutes to about 40 g/10 minutes, in some examples, about 25 g/10 minutes to about 35 g/10 minutes.

In some examples, (a) the first thermoplastic resin and/or second thermoplastic resin is/are selected from (i) a copolymer of an alkylene monomer and a monomer selected from acrylic acid and methacrylic acid, (ii) an ethylene-vinyl acetate copolymer and (iii) a terpolymer of ethylene, an acrylic ester and maleic anhydride, and/or, in some examples, (b) the first thermoplastic resin is different from the second thermoplastic resin. If the first thermoplastic resin is different from the second thermoplastic resin, preferably the first thermoplastic resin has a lower melting point than the second thermoplastic resin, and the melting point may be determined by the test method according to ASTM D3418 and/or ISO3146. For example, if the first thermoplastic resin is different from the second thermoplastic resin and the first resin comprises a co-polymer of ethylene and methacrylic acid and the second polymer comprises a co-polymer of ethylene and methacrylic acid, preferably the co-polymer of ethylene and methacrylic acid in the first resin has a lower melting point than the co-polymer of ethylene and methacrylic acid in the second resin resin, and the melting point may be determined by the test method according to ASTM D3418 and/or ISO3146. A polymer may have a lower melting point than another polymer by virtue of a lower molecular weight. A first polymer may have a lower melting point than a second polymer by virtue of a lower molecular weight of the first polymer compared to the second polymer.

In an example, the polymer or polymers of the resin can be selected from the Nucrel family of resins (e.g., Nucrel 403™, Nucrel 407™, Nucrel 609HS™, Nucrel 908HS™, Nucrel 1202HC™, Nucrel 30707™, Nucrel 1214™, Nucrel 903™, Nucrel 3990™, Nucrel 910™, Nucrel 925™, Nucrel 699™, Nucrel 599™, Nucrel 960™, Nucrel RX 76™, Nucrel 2806™, Bynell 2002, Bynell 2014, and Bynell 2020 (sold by E. I. du PONT)), the Aclyn family of resins (e.g. Aaclyn 201, Aclyn 246, Aclyn 285, and Aclyn 295), and the Lotader family of resins (e.g. Lotader 2210, Lotader, 3430, and Lotader 8200 (sold by Arkema)).

Pigments

The first electrostatic ink composition substantially lacks a pigment. In some examples, the first electrostatic ink composition lacks a pigment. In some examples, the first electrostatic ink composition is a transparent electrostatic ink composition that substantially lacks or lacks a pigment.

In some examples, the first electrostatic ink composition lacks inorganic particulate material. In some examples, the first electrostatic ink composition is substantially transparent when printed.

In some examples, the first electrostatic ink composition may be a substantially colorless, clear or transparent composition substantially free from pigment.

As used herein, "substantially free from pigment" and "substantially lacks a pigment" are used to describe a first electrostatic ink composition in which 1 wt. % or less of the solids in the composition are made up of pigment, in some examples, 0.5 wt. % or less of the solids in the composition are made up of pigment, in some examples, 0.1 wt. % or less of the solids in the composition are made up of pigment, in some examples, 0.05 wt. % or less of the solids in the composition are made up of pigment, in some examples, 0.01 wt. % or less of the solids in the composition are made up of pigment.

The second electrostatic ink composition comprises a pigment. In some examples, the second thermoplastic resin may further include a pigment. In some examples, in the second electrostatic ink composition before printing on the substrate, the second thermoplastic resin coats the pigment. In some examples, in the second electrostatic ink composition before printing on the substrate, the second thermoplastic resin coats the pigment such that particles are formed having a core of pigment and an outer layer of the second thermoplastic resin thereon. The outer layer of second thermoplastic resin may coat the pigment partially or completely. In the second electrostatic ink composition once printed on the substrate, the second thermoplastic resin forms a film in which the particles of the pigment are embedded.

The pigment or pigments may be any pigment compatible with the liquid carrier and useful for electrostatic printing. The pigment may comprise particles of a colorant, e.g. an inorganic material. For example, the pigment may be present as pigment particles, or may include a resin (in addition to the second thermoplastic resin(s) described herein) and a pigment. The resins and pigments can be any of those commonly used as known in the art.

The pigment may be unicolour or composed of any combination of available colours. In some examples, the pigment may be selected from a white pigment, a cyan pigment, a yellow pigment, a magenta pigment and a black pigment. The second electrostatic ink composition may include a plurality of pigments. The second electrostatic ink composition may include a first pigment and a second pigment, which are different from one another. Further pigments may also be present with the first and second pigments. The second electrostatic ink composition may include first and second pigments where each are independently selected from a white pigment, a cyan pigment, a yellow pigment, a magenta pigment and a black pigment. In some examples, the first pigment includes a black pigment and the second pigment includes a non-black pigment, for example, a pigment selected from a white pigment, a cyan pigment, a yellow pigment and a magenta pigment.

Some example pigments that may be used in the second electrostatic ink composition are pigments sold by Hoechst including Permanent Yellow DHG, Permanent Yellow GR, Permanent Yellow G, Permanent Yellow NCG-71, Permanent Yellow GG, Hansa Yellow RA, Hansa Brilliant Yellow 5GX-02, Hansa Yellow X, NOVAPERM® YELLOW HR, NOVAPERM® YELLOW FGL, Hansa Brilliant Yellow 10GX, Permanent Yellow G3R-01, HOSTAPERM® YELLOW H4G, HOSTAPERM® YELLOW H3G, HOSTAPERM® ORANGE GR, HOSTAPERM® SCARLET GO, Permanent Rubine F6B; pigments by Sun Chemical including L74-1357 Yellow, L75-1331 Yellow, L75-2337 Yellow; pigments by Heubach including DALAMAR® YELLOW YT-858-D; pigments by Ciba-Geigy including CROMOPHTHAL® YELLOW 3 G, CROMOPHTHAL® YELLOW GR, CROMOPHTHAL® YELLOW 8 G, IRGAZINE® YELLOW 5GT, IRGALITE® RUBINE 4BL, MONASTRAL® MAGENTA, MONASTRAL® SCARLET, MONASTRAL® VIOLET, MONASTRAL® RED, MONASTRAL® VIOLET; pigments by BASF including LUMOGEN® LIGHT YELLOW, PALIOGEN® ORANGE, HELIOGEN® BLUE L 690 IF, HELIOGEN® BLUE TBD 7010, HELIOGEN® BLUE K 7090, HELIOGEN® BLUE L 710 IF, HELIOGEN® BLUE L 6470, HELIOGEN® GREEN K 8683, HELIOGEN® GREEN L 9140; pigments by Mobay including QUINDO® MAGENTA, INDOFAST® BRILLIANT SCARLET, QUINDO® RED 6700, QUINDO® RED 6713, INDOFAST® VIOLET; pigments by Cabot including Maroon B STERLING® NS BLACK, STERLING® NSX 76, MOGUL® L; pigments by DuPont including TIPURE® R-101; and pigments by Paul Uhlich including UHLICH® BK 8200. Where the pigment is a white pigment particle, the pigment particle may be selected from the group consisting of $TiO_2$, calcium carbonate, zinc oxide, and mixtures thereof. In some examples, the white pigment particle may comprise an alumina-$TiO_2$ pigment.

In some examples, the pigment(s) in the second electrostatic ink composition constitutes a certain wt. %, for example, from about 1 wt. %, to about 60 wt. %, in some examples, from about 20 wt. % to about 50 wt. %, of the solids of the second electrostatic ink composition, and the remaining wt. % of the solids of the second electrostatic ink composition is formed by the second thermoplastic resin and, in some examples, any other additives that are present. The other additives may constitute about 10 wt. % or less of the solids of the second electrostatic ink composition, in some examples, about 5 wt. % or less of the solids of the second electrostatic ink composition, in some examples, about 3 wt. % or less of the solids of the second electrostatic ink composition. In some examples, the second thermoplastic resin may constitute about 5% to about 99% by weight of the solids in the second electrostatic ink composition, in some examples, about 50% to about 90% by weight of the solids of the second electrostatic ink composition, in some examples, about 70% to about 90% by weight of the solids of the electrostatic ink composition. The remaining wt. % of the solids in the second electrostatic ink composition may be a pigment(s) and, in some examples, any other additives that may be present.

Carrier Liquid

The first electrostatic ink composition, before printing on the substrate, may further comprise a carrier liquid. The second electrostatic ink composition, before printing on the substrate, may further comprise a carrier liquid. The first electrostatic ink composition and the second electrostatic ink composition, before printing on the substrate, may each further comprise a carrier liquid. The first electrostatic ink composition and the second electrostatic ink composition, before printing on the substrate, may each comprise a different carrier liquid. The first electrostatic ink composition and the second electrostatic ink composition, before printing on the substrate, may each comprise the same carrier liquid.

In some examples, the carrier liquid is different from the liquid solvent composition. In some examples, the carrier liquid is the same as the liquid solvent composition.

In some examples, the thermoplastic resin may be dispersed in the carrier liquid. In the second electrostatic ink composition, the pigment and the second thermoplastic resin may be dispersed in the carrier liquid.

The carrier liquid can include or be a hydrocarbon, silicone oil, vegetable oil, and the like. The carrier liquid can include, but is not limited to, an insulating, non-polar, non-aqueous liquid that can be used as a medium for the thermoplastic resin components. The carrier liquid can include compounds that have a resistivity in excess of about 109 ohm-cm. The carrier liquid may have a dielectric constant below about 5, in some examples, below about 3. The carrier liquid can include, but is not limited to, hydrocarbons. The hydrocarbon can include, but is not limited to, aliphatic hydrocarbons, isomerized aliphatic hydrocarbons, branched chain aliphatic hydrocarbons, aromatic hydrocarbons, and combinations thereof. Examples of the carrier liquids include, but are not limited to, aliphatic hydrocarbons, isoparaffinic compounds, paraffinic compounds, dearomatized hydrocarbon compounds, and the like. In particular, the carrier liquids can include, but are not limited to, Isopar G™, Isopar H™, Isopar L™, Isopar M™, Isopar K™, Isopar V™, Norpar 12™, Norpar 13™, Norpar 15™, Exxol D40™, Exxol D80™, Exxol D100™, Exxol D130™, and Exxol D140™ (each sold by EXXON CORPORATION); Teclen N-16™, Teclen N-20™, Teclen N-22™, Nisseki Naphthesol L™, Nisseki Naphthesol M™, Nisseki Naphthesol H™, #0 Solvent L™, #0 Solvent M™, #0 Solvent H™, Nisseki Isosol 300™, Nisseki Isosol 400™, AF-4™, AF-5™, AF-6™ and AF-7™ (each sold by NIPPON OIL CORPORATION); IP Solvent 1620™ and IP Solvent 2028™ (each sold by IDEMITSU PETROCHEMICAL CO., LTD.); Amsco OMS™ and Amsco 460™ (each sold by AMERICAN MINERAL SPIRITS CORP.); and Electron, Positron, New II, Purogen HF (100% synthetic terpenes) (sold by ECOLINK™).

The carrier liquid may constitute about 20% to 99.5% by weight of the electrostatic ink composition (before printing it on the substrate), in some examples, 50% to 99.5% by weight of the electrostatic ink composition. The carrier liquid may constitute about 40 to 90% by weight of the electrostatic ink composition (before printing it on the substrate). The carrier liquid may constitute about 60% to 80% by weight of the electrostatic ink composition (before printing it on the substrate). The carrier liquid may constitute about 90% to 99.5% by weight of the electrostatic ink composition (before printing it on the substrate), in some examples, 95% to 99% by weight of the electrostatic ink composition (before printing it on the substrate).

The electrostatic ink composition, when printed on a substrate, may be substantially free from carrier liquid. In an electrostatic printing process and/or afterwards, the carrier liquid may be removed, for example, by an electrophoresis processes during printing and/or evaporation, such that substantially just solids are transferred to the substrate. Substantially free from carrier liquid may indicate that the electrostatic ink composition printed on the substrate contains 5 wt. % or less carrier liquid, in some examples, 2 wt. % or less carrier liquid, in some examples, 1 wt. % or less carrier liquid, in some examples, 0.5 wt. % or less carrier liquid. In some examples, the electrostatic ink composition printed on the substrate is free from carrier liquid.

Charge Director

The first electrostatic ink composition may include a charge director. The second electrostatic ink composition may include a charge director. The first electrostatic ink composition and the second electrostatic ink composition may include the same charge director or different charge directors.

The charge director may be added to an electrostatic ink composition in order to impart and/or maintain sufficient electrostatic charge on particles within the electrostatic ink composition when in its liquid form (e.g. before printing on the substrate).

In some examples, the charge director may be selected from ionic compounds, such as metal salts of fatty acids, metal salts of sulfo-succinates, metal salts of oxyphosphates, metal salts of alkyl-benzenesulfonic acid, metal salts of aromatic carboxylic acids or sulfonic acids, as well as zwitterionic and non-ionic compounds, such as polyoxyethylated alkylamines, lecithin, polyvinylpyrrolidone, organic acid esters of polyvalent alcohols, and so forth. In some examples, the charge director is selected from, but is not limited to, oil-soluble petroleum sulfonates (e.g., neutral Calcium Petronate™, neutral Barium Petronate™, and basic Barium Petronate™), polybutylene succinimides (e.g., OLOA™ 1200 and Amoco 575), and glyceride salts (e.g., sodium salts of phosphated mono- and diglycerides with unsaturated and saturated acid substituents), sulfonic acid salts including, but not limited to, barium, sodium, calcium, and aluminium salts of a sulfonic acid. The sulfonic acids may include, but are not limited to, alkyl sulfonic acids, aryl sulfonic acids, and sulfonic acids of alkyl succinates (e.g., see WO 2007/130069). In some examples, the charge director imparts a negative charge on the particles of the electrostatic ink composition. In some examples, the charge director imparts a positive charge on the particles of the electrostatic ink composition. In some examples, the charge director comprises a phospholipid, in some examples, a salt or an alcohol of a phospholipid. In some examples, the charge director comprises species selected from a phosphatidylcholine and derivatives thereof.

In some examples, the charge director includes a sulfosuccinate moiety of the general formula [R1'-O—C(O)CH$_2$CH(SO$_3^-$)C(O)—O—R2'], in which each of R1' and R2' is an alkyl group. In some examples, the charge director includes nanoparticles of a simple salt and a sulfosuccinate salt of the general formula MA$_n$, wherein M is a metal, n is the valence of M, and A is an ion of the general formula [R1'-O—C(O)CH$_2$CH(SO$_3^-$)C(O)—O—R2'], in which each of R1' and R2' is an alkyl group, or other charge directors as found in WO2007130069, which is incorporated herein by reference in its entirety. As described in WO2007130069, the sulfosuccinate salt of the general formula MA$_n$ is an example of a micelle forming salt. The charge director may be substantially free or free of an acid of the general formula HA, in which A is as described above. The charge director may include micelles of said sulfosuccinate salt enclosing at least some of the nanoparticles. The charge director may include at least some nanoparticles having a size of 200 nm or less, and/or, in some examples, 2 nm or more. As described in WO2007130069, simple salts are salts that do not form micelles by themselves, although they may form a core for micelles with a micelle forming salt. The ions constructing the simple salts are all hydrophilic. The simple salt may include a cation selected from the group consisting of Mg, Ca, Ba, NH$_4$, tert-butyl ammonium, Li⁺, and Al³⁺, or from any sub-group thereof. The simple salt may include an anion selected from the group consisting of $SO_4^{2-}$, $PO_3^-$, $NO_3^-$, $HPO_4^{2-}$, $CO_3^{2-}$, acetate, trifluoroacetate (TFA), Cl⁻, $BF_4^-$, $ClO_4^-$, and $TiO_3^{4-}$, or from any sub-group thereof. The simple salt may be selected from $CaCO_3$, $Ba2TiO_3$, $Al_2(SO_4)$, $Al(NO_3)_3$, $Ca_3(PO_4)_2$, $BaSO_4$, $BaHPO_4$, $Ba_2(PO_4)_3$, $CaSO_4$, $(NH_4)_2CO_3$, $(NH_4)_2SO_4$, $NH_4OAc$, tert-butyl ammonium bromide, $NH_4NO_3$, LiTFA, $Al_2(SO_4)_3$, $LiClO_4$ and $LiBF_4$, or any sub-group thereof. The charge director may further include basic barium petronate (BBP).

In the formula [R1'-O—C(O)CH₂CH($SO_3^-$)C(O)—O—R2'] in some examples, each of R1' and R2' is an aliphatic alkyl group. In some examples, each of R1' and R2' independently is a C6-25 alkyl group. In some examples, said aliphatic alkyl group is linear. In some examples, said aliphatic alkyl group is branched. In some examples, said aliphatic alkyl group includes a linear chain of more than 6 carbon atoms. In some examples, R1' and R2' are the same. In some examples, at least one of R1' and R2' is $C_{13}H_{27}$. In some examples, M is Na, K, Cs, Ca, or Ba. The formula [R1'-O—C(O)CH₂CH($SO_3^-$)C(O)—O—R2'] and/or the formula $MA_n$ may be as defined in any part of WO2007130069.

The charge director may include one of, some of or all of (i) soya lecithin, (ii) a barium sulfonate salt, such as basic barium petronate (BPP), and (iii) an isopropyl amine sulfonate salt. Basic barium petronate is a barium sulfonate salt of a 21-26 carbon hydrocarbon alkyl, and can be obtained, for example, from Chemtura. An example isopropyl amine sulphonate salt is dodecyl benzene sulfonic acid isopropyl amine, which is available from Croda.

In some examples, the charge director constitutes about 0.001% to 20% by weight, in some examples, 0.01% to 20% by weight, in some examples, 0.01% to 10% by weight, in some examples, 0.01% to 1% by weight of the solids of an electrostatic ink composition. In some examples, the charge director constitutes about 0.001% to 0.15% by weight of the solids of an electrostatic ink composition, in some examples, 0.001% to 0.15%, in some examples, 0.001% to 0.02% by weight of the solids of an electrostatic ink composition, in some examples, 0.1% to 2% by weight of the solids of the electrostatic ink composition, in some examples, 0.2% to 1.5% by weight of the solids of the electrostatic ink composition, in some examples, 0.1% to 1% by weight of the solids of the electrostatic ink composition, in some examples, 0.2% to 0.8% by weight of the solids of the electrostatic ink composition. In some examples, the charge director is present in an amount of at least 1 mg of charge director per gram of solids of the electrostatic ink composition (which will be abbreviated to mg/g), in some examples, at least 2 mg/g, in some examples, at least 3 mg/g, in some examples, at least 4 mg/g, in some examples, at least 5 mg/g. In some examples, the moderate acid is present in the amounts stated above, and the charge director is present in an amount of from 1 mg to 50 mg of charge director per gram of solids of the electrostatic ink composition (which will be abbreviated to mg/g), in some examples, from 1 mg/g to 25 mg/g, in some examples, from 1 mg/g to 20 mg/g, in some examples, from 1 mg/g to 15 mg/g, in some examples, from 1 mg/g to 10 mg/g, in some examples, from 3 mg/g to 20 mg/g, in some examples, from 3 mg/g to 15 mg/g, in some examples, from 5 mg/g to 10 mg/g.

None of the types of charge director, for the purposes of this disclosure, constitute a pigment.

Charge Adjuvant

The first electrostatic ink compositions may include a charge adjuvant. The second electrostatic ink composition may include a charge adjuvant. The first electrostatic ink composition and the second electrostatic ink composition may include the same charge adjuvant or different charge adjuvants.

A charge adjuvant may promote charging of the particles, during electrostatic printing, when a charge director is present. The charge adjuvant can include, but is not limited to, barium petronate, calcium petronate, Co salts of naphthenic acid, Ca salts of naphthenic acid, Cu salts of naphthenic acid, Mn salts of naphthenic acid, Ni salts of naphthenic acid, Zn salts of naphthenic acid, Fe salts of naphthenic acid, Ba salts of stearic acid, Co salts of stearic acid, Pb salts of stearic acid, Zn salts of stearic acid, Al salts of stearic acid, Zn salts of stearic acid, Cu salts of stearic acid, Pb salts of stearic acid, Fe salts of stearic acid, metal carboxylates (e.g., Al tristearate, Al octanoate, Li heptanoate, Fe stearate, Fe distearate, Ba stearate, Cr stearate, Mg octanoate, Ca stearate, Fe naphthenate, Zn naphthenate, Mn heptanoate, Zn heptanoate, Ba octanoate, Al octanoate, Co octanoate, Mn octanoate, and Zn octanoate), Co lineolates, Mn lineolates, Pb lineolates, Zn lineolates, Ca oleates, Co oleates, Zn palmirate, Ca resinates, Co resinates, Mn resinates, Pb resinates, Zn resinates, AB diblock copolymers of 2-ethylhexyl methacrylate-co-methacrylic acid calcium and ammonium salts, copolymers of an alkyl acrylamidoglycolate alkyl ether (e.g., methyl acrylamidoglycolate methyl ether-co-vinyl acetate), and hydroxy bis(3,5-di-tert-butyl salicylic) aluminate monohydrate. In some examples, the charge adjuvant is aluminium di- or tristearate.

The charge adjuvant may be present in an amount of about 0.1% to 5% by weight, in some examples, about 0.1% to 1% by weight, in some examples, about 0.3% to 0.8% by weight of the solids of the electrostatic ink composition, in some examples, about 1 wt. % to 3 wt. % of the solids of the electrostatic ink composition, in some examples, about 1.5 wt. % to 2.5 wt. % of the solids of the electrostatic ink composition.

In some examples, the electrostatic ink composition further includes, for example, as a charge adjuvant, a salt of a multivalent cation and a fatty acid anion. The salt of a multivalent cation and a fatty acid anion can act as a charge adjuvant. The multivalent cation may, in some examples, be a divalent or a trivalent cation. In some examples, the multivalent cation is selected from Group 2, transition metals and Group 3 and Group 4 in the Periodic Table. In some examples, the multivalent cation includes a metal selected from Ca, Sc, Ti, V, Cr, Mn, Fe, Co, Ni, Cu, Zn, Al and Pb. In some examples, the multivalent cation is $Al^{3+}$. The fatty acid anion may be selected from a saturated or unsaturated fatty acid anion. The fatty acid anion may be selected from a C8 to C26 fatty acid anion, in some examples, a C14 to C22 fatty acid anion, in some examples, a C16 to C20 fatty acid anion, in some examples, a C17, C18 or C19 fatty acid anion. In some examples, the fatty acid anion is selected from a caprylic acid anion, capric acid anion, lauric acid anion, myristic acid anion, palmitic acid anion, stearic acid anion, arachidic acid anion, behenic acid anion and cerotic acid anion.

The charge adjuvant, which may, for example, be or include a salt of a multivalent cation and a fatty acid anion, may be present in an amount of 0.1 wt. % to 5 wt. % of the solids of the electrostatic ink composition, in some examples, in an amount of 0.1 wt. % to 2 wt. % of the solids of the electrostatic ink composition, in some examples, in an amount of 0.1 wt. % to 2 wt. % of the solids of the electrostatic ink composition, in some examples, in an amount of 0.3 wt. % to 1.5 wt. % of the solids of the electrostatic ink composition, in some examples, about 0.5 wt. % to 1.2 wt. % of the solids of the electrostatic ink composition, in some examples, about 0.8 wt. % to 1 wt. % of the solids of the electrostatic ink composition, in some examples, about 1 wt % to 3 wt. % of the solids of the electrostatic ink composition, in some examples, about 1.5 wt % to 2.5 wt. % of the solids of the electrostatic ink composition.

The charge adjuvant may be termed a grinding aid.

None of the types of charge adjuvant, for the purposes of this disclosure, constitute a pigment.

Other Additives

The first and/or second electrostatic ink composition may include an additive or a plurality of additives. The additive or plurality of additives may be added at any stage of producing the electrostatic ink composition. The additive or plurality of additives may be selected from a wax, a surfactant, biocides, organic solvents, viscosity modifiers, materials for pH adjustment, sequestering agents, preservatives, compatibility additives, emulsifiers and the like. The wax may be an incompatible wax. As used herein, "incompatible wax" may refer to a wax that is incompatible with the resin. Specifically, the wax phase separates from the resin phase upon cooling of the resin fused mixture on a print substrate during and after the transfer of the electrostatic ink composition to a print substrate during printing of the electrostatic ink composition.

Liquid Solvent Composition

The liquid solvent composition causes swelling of the first thermoplastic resin and the second thermoplastic resin.

In some examples, the liquid solvent composition consists essentially of a solvent. In some examples, the liquid solvent composition consists of a solvent. In this context, "consists essentially of" a component means constitutes 95 wt. % or more, 96 wt. % or more, 97 wt. % or more, 98 wt. % or more, 99 wt. % or more, 99.5 wt. % or more of that component.

In some examples, the liquid solvent composition may be the same as the carrier liquid. In some examples, the liquid solvent composition may be different from the carrier liquid.

In some examples, the liquid solvent composition is applied in an amount sufficient to form a coat weight of 5 $g/m^2$ or less, in some examples, 4 $g/m^2$ or less, in some examples, 3 $g/m^2$ or less, in some examples, 2 $g/m^2$ or less, in some examples, 1.5 $g/m^2$ or less, in some examples, 1 $g/m^2$ or less on the surface of the substrate. In some examples, the liquid solvent composition is applied in an amount sufficient to form a coat weight of 0.1 $g/m^2$ or more, in some examples, 0.15 $g/m^2$ or more, in some examples, 0.2 $g/m^2$ or more, in some examples, 0.3 $g/m^2$ or more, in some examples, 0.4 $g/m^2$ or more, in some examples, 0.5 $g/m^2$ or more on the surface of the substrate. In some examples, the liquid solvent composition is applied in an amount sufficient to form a coat weight of 0.1 $g/m^2$ to 5 $g/m^2$, in some examples, 0.15 $g/m^2$ to 4 $g/m^2$, in some examples, 0.2 $g/m^2$ to 3 $g/m^2$, in some examples, 0.3 $g/m^2$ to 2 $g/m^2$, in some examples, 0.4 $g/m^2$ to 1.5 $g/m^2$, in some examples, 0.5 $g/m^2$ to 1 $g/m^2$ on the surface of the substrate.

In some examples, the liquid solvent composition may comprise a mineral oil.

The liquid solvent composition may include or be a hydrocarbon, silicone oil, vegetable oil, and the like. The liquid solvent composition can include, but is not limited to, an insulating, non-polar, non-aqueous liquid that can be used to swell the thermoplastic resin components. The liquid solvent composition can include, but is not limited to, hydrocarbons. The hydrocarbon can include, but is not limited to, aliphatic hydrocarbons, isomerized aliphatic hydrocarbons, branched chain aliphatic hydrocarbons, aromatic hydrocarbons, and combinations thereof. Examples of the liquid solvent composition include, but are not limited to, aliphatic hydrocarbons, isoparaffinic compounds, paraffinic compounds, dearomatized hydrocarbon compounds, and the like.

In some examples, the liquid solvent composition may comprise isoparaffinic hydrocarbons. In some examples, the liquid solvent composition may comprise a mixture of isoparaffinic hydrocarbons. In some examples, the isoparaffinic hydrocarbon comprises one or more isoalkanes with 5 or more carbon atoms, in some examples, 6 or more carbon atoms, in some examples, 7 or more carbon atoms. In some examples, the isoparaffinic hydrocarbon comprises one or more isoalkanes with 30 or fewer carbon atoms, in some examples, 25 or fewer carbon atoms, in some examples, 20 or fewer carbon atoms. In some examples, the isoparaffinic hydrocarbon comprises one or more isoalkanes with 5 to 30 carbon atoms, in some examples, 6 to 25 carbon atoms, in some examples, 7 to 20 carbon atoms. In some examples, the liquid solvent composition comprises a mixture of isoparaffinic hydrocarbons with 5 to 30 carbon atoms, in some examples, 6 to 25 carbon atoms, in some examples, 7 to 20 carbon atoms. In some examples, the liquid solvent composition comprises a mixture of isoparaffinic hydrocarbons with 7 to 9 carbon atoms, in some examples, with 11 to 13 hydrocarbons, in some examples, with 14 to 19 carbon atoms, in some examples with 11 to 19 carbon atoms. In some examples, the liquid solvent composition comprises a mixture of two mixtures of isoparaffinic hydrocarbons, for example, a mixture with 11 to 13 carbon atoms and a mixture with 14 to 19 carbon atoms, which may be in used in a ratio of 30:70, in some examples, 40:60, in some examples, 50:50.

The liquid solvent composition may have a boiling point at a single temperature, which may be simply termed "boiling point" herein. The liquid solvent composition may have boil over a range of temperatures, the lowest of which may be termed the "initial boiling point" and the highest of which may be termed "final boiling point". The measurement of boiling point, the boiling point range, initial boiling point and final boiling point may be determined in accordance with standard methods, e.g. a test method selected from D86-16a and ASTM D1078-11.

In some examples, the boiling point or initial boiling point of the liquid solvent composition is 50° C. or above, in some examples, 60° C. or above, in some examples, 70° C. or above, in some examples, 80° C. or above, in some examples, 85° C. or above, in some examples, 90° C. or above. In some examples, the boiling point or final boiling point of the liquid solvent composition is 400° C. or below, in some examples, 390° C. or below, in some examples, 380° C. or below, in some examples, 370° C. or below, in some examples 360° C. or below. In some examples, the boiling point or boiling point range of the liquid solvent composition is 50° C. to 400° C., in some examples, 60° C. to 390° C., in some examples, 70° C. to 380° C., in some examples, 80° C. to 370° C., in some examples, 85° C. to 360° C.

If a boiling range is given herein, e.g. "the boiling range is X ° C. to Y ° C.", this may indicate a boiling range having an initial boiling point of X ° C. and a final boiling point of Y ° C. Boiling range may also be termed distillation range.

In some examples, the boiling point range of the liquid solvent composition is 50° C. to 200° C., in some examples, 60° C. to 190° C., in some examples, 70° C. to 180° C., in some examples, 80° C. to 160° C., in some examples, 90° C. to 150° C. In some examples, the boiling point range of the liquid solvent composition is 90° C. to 150° C. and the liquid solvent composition is or comprises a mixture of isoparaffinic hydrocarbons with 7 to 9 carbon atoms. In some examples, the liquid solvent composition comprises Isopar E.

In some examples, the boiling point range of the liquid solvent composition is 120° C. to 400° C., in some examples, 130° C. to 390° C., in some examples, 140° C. to 380° C., in some examples, 150° C. to 370° C., in some examples, 160° C. to 360° C., in some examples, 170° C. to 355° C. In some examples, the boiling point range of the liquid solvent composition is 170° C. to 355° C. and the liquid solvent composition is or comprises a mixture of isoparaffinic hydrocarbons with 11 to 19 carbon atoms. In some examples, the liquid solvent composition comprises a mixture of Isopar L and Isopar V, which may, in some examples, be used in a ratio of 50:50.

In some examples, the boiling point range of the liquid solvent composition is 120° C. to 300° C., in some examples, 130° C. to 290° C., in some examples, 140° C. to 280° C., in some examples, 150° C. to 270° C., in some examples, 160° C. to 260° C., in some examples, 170° C. to 250° C. In some examples, the boiling point range of the liquid solvent composition is 170° C. to 250° C. and the liquid solvent composition is or comprises a mixture of isoparaffinic hydrocarbons with 11 to 13 carbon atoms. In some examples the liquid solvent composition comprises Isopar L.

In some examples, the boiling point range of the liquid solvent composition is 190° C. to 400° C., in some examples, 200° C. to 390° C., in some examples, 210° C. to 380° C., in some examples, 220° C. to 370° C., in some examples, 225° C. to 360° C., in some examples, 229° C. to 355° C. In some examples, the boiling point range of the liquid solvent composition is 229° C. to 355° C. and the liquid solvent composition is or comprises a mixture of isoparaffinic hydrocarbons with 14 to 19 carbon atoms. In some examples, the liquid solvent composition comprises Isopar V.

In particular, the liquid solvent composition can include, but is not limited to, Isopar-G™, Isopar-H™, Isopar-L™, Isopar-M™, Isopar-K™, Isopar-V™, Norpar 12™, Norpar 13™, Norpar 15™, Exxol D40™, Exxol D80™, Exxol D100™, Exxol D130™, and Exxol D140™ (each sold by EXXON CORPORATION); Teclen N-16™, Teclen N-20™, Teclen N-22™, Nisseki Naphthesol L™, Nisseki Naphthesol M™, Nisseki Naphthesol H™, #0 Solvent L™, #0 Solvent M™, #0 Solvent H™, Nisseki Isosol 300™, Nisseki Isosol 400™, AF-4™, AF-5™, AF-6™ and AF-7™ (each sold by NIPPON OIL CORPORATION); IP Solvent 1620™ and IP Solvent 2028™ (each sold by IDEMITSU PETROCHEMICAL CO., LTD.); Amsco OMS™ and Amsco 460™ (each sold by AMERICAN MINERAL SPIRITS CORP.); Electron, Positron, New II, Purogen HF (100% synthetic terpenes) (sold by ECOLINK™), and mixtures thereof.

Substrate

The substrate may be or comprise any suitable material (e.g. having a surface having a first area and a second area) capable of being printed thereon, e.g. by an electrostatic ink. The substrate may, for example, be or comprise any suitable material (e.g. having a surface having a first area and a second area) capable of being electrostatically printed thereon e.g. by an electrostatic ink. The substrate may comprise a material selected from an organic or inorganic material. The substrate may comprise a natural polymeric material, for example, cellulose. The substrate may comprise a synthetic polymeric material, for example, a plastic. The substrate may comprise a polymer formed from alkylene monomers, including, but not limited to, polyethylene and polypropylene, and copolymers such as styrene-polybutadiene. The polypropylene may be biaxially orientated polypropylene. The material may comprise a metal, which may be in sheet form. The metal may be selected from or made from, for instance, aluminium (Al), silver (Ag), tin (Sn), copper (Cu), or mixtures thereof. In some examples, the substrate comprises a cellulosic paper, card or cardboard. In some examples, the cellulosic paper is coated with a polymeric material, for example, a polymer formed from styrene-butadiene resin. In some examples, the cellulosic paper has an inorganic material bound to its surface (before printing with ink) with a polymeric material, wherein the inorganic material may be selected from, for example, kaolinite or calcium carbonate. The substrate may be a cellulosic substrate such as paper. The cellulosic substrate may be a coated cellulosic substrate, for example, having a coating of a polymeric material thereon. In some examples, the cellulosic substrate is paper, optionally, sheets of paper or a roll of paper.

Foiling Material

In some examples, the foiling material may comprise any suitable foiling material. In some examples, the foiling material comprises any frangible material. In some examples, the foiling material may comprise a material that is so thin that it is frangible.

In some examples, a carrier layer is applied to a surface of the foiling material. In some examples, the carrier layer is a polymeric film. In some examples, the polymeric film is a polyester film or a Teflon®-based film. In some examples, the carrier layer is applied to the surface of the foiling material before the foiling material is contacted with the first electrostatic ink composition to aid application of the foiling material to the substrate. In some examples, the carrier layer is applied to the opposing surface of the foiling material from the surface that will be contacted with the first electrostatic ink composition. In some examples, after the foiling material is contacted with the first electrostatic ink composition, the carrier layer is removed from the foiling material. In some examples, the removal of the carrier layer from the foiling material also removes any foiling material that has not adhered to the first electrostatic ink composition, which may be foiling material that was not in contact with the first electrostatic ink composition. In some examples, the removal of the carrier layer from the foiling material also removes foiling material that has not adhered to the first electrostatic ink composition, which may be foiling material that was in contact with the second electrostatic ink composition. In some examples, the carrier layer comprises a release material and a carrier material and the release material contacts the surface of the foiling material.

In some examples, the foiling material is a metallic material. In some examples, the foiling material is a tissue-like material coated with metal or a component with a metallic appearance. In some examples, the foiling material is a polymeric film such as a polyester film or a polyester metalized film, or a Teflon®-based film. In some examples, the foiling material is a smooth polyester metalized film.

In some examples, the foiling material may be bright, glossy, pearlescent, dull or matte in appearance. The foiling material may have any colour, including gold, silver, red, blue, orange, pink, green, purple, cyan, yellow, magenta, white or black. In some examples, the foiling material may be patterned, for example, a wood grain pattern or a cobblestone pattern. In some examples, the foiling material may be opaque. In other examples, the foiling material may be transparent or semi-transparent.

In some examples, the foiling material has a metallic appearance. In some examples, the foiling material provides optical effects to the substrate. In some examples, the optical effects are holographic effects. In some examples, the foiling material is semi-translucent. In some examples, the foiling material is a glossing material, that is, a material that provides a gloss. In some examples, the foiling material is a smoothing film.

In some examples, the foiling material has a thickness of 200 µm or less, in some examples, the foiling material has a thickness of 100 µm or less, in some examples, the foiling material has a thickness of 50 µm or less, in some examples, the foiling material has a thickness of 25 µm or less.

In some examples, the foiling material has a thickness of 1 µm or more, in some examples, the foiling material has a thickness of 5 µm or more, in some examples, the foiling material has a thickness of 10 µm or more, in some examples, the foiling material has a thickness of 15 µm or more.

In some examples, the foiling material has a thickness of 1 to 200 µm, in some examples, the foiling material has a thickness of 5 to 100 µm, in some examples, the foiling material has a thickness of 10 to 50 µm, in some examples, the foiling material has a thickness of 15 to 25 µm.

Electrostatic and Foil Printing System

Described herein is an electrostatic and foil printing system comprising an electrostatic printing device, the device, in use, to electrostatically print on a substrate having a surface comprising a first area and a second area, wherein the electrostatic printing device prints on the first area a first electrostatic ink composition comprising a first thermoplastic resin and substantially lacking a pigment and prints on the second area a second electrostatic ink composition comprising a second thermoplastic resin and a pigment;

a component to apply a liquid solvent composition to the first electrostatic ink composition on the first area and the second electrostatic ink composition on the second area, to swell the first and second thermoplastic resins; and a foil printing device, the foil printing device to contact a foiling material with the first electrostatic ink composition on the first area wherein the foiling material selectively adheres to the first area on the surface of the substrate.

In some examples, the electrostatic printing device comprises at least two toner reservoirs, wherein one toner reservoir contains the first electrostatic ink composition and the second toner reservoir contains the second electrostatic ink composition.

In some examples, the electrostatic printing device is a liquid electrostatic printing device.

In some examples, the electrostatic printing device comprises a photoconductive member having a surface on which a latent electrostatic image can be created. In some examples, the electrostatic printing device comprises an intermediate transfer member (ITM).

In some examples, the component to apply a liquid solvent composition and the foil printing device are connected such that, in use, the substrate is transferred from a substrate input point in the component to apply a liquid solvent composition through the component to apply a liquid solvent composition to the foil printing device and through the foil printing device to a substrate output station. The component to apply a liquid solvent composition may be selected from an air knife coating device, an anilox coating device, a brush coating device, a flexography printing apparatus, a gravure printing apparatus, a metering rod coating device, a pad printing device, a rod coating device, a roller coating device (e.g., for forward roller coating or reverse roller coating), a slot die coating device (e.g., for extrusion coating, curtain coating, slide coating, slot die bead coating, tensioned-web slot die coating), a spin coating device, a spray coating device, a dip coating device, a screen printing device (e.g., for rotary screen coating), and inkjet printing apparatus.

In some examples, the electrostatic printing and foiling system is adapted, in use, to transfer a substrate from a substrate input station through the electrostatic printing device to the component to apply a liquid solvent composition, through the component to apply a liquid solvent composition to the foil printing device and through the foil printing device to a substrate output station.

In some examples, the foil printing device is a hot foil printing device. In some examples, the foil printing device heats the substrate. In some examples, the foil printing device heats the substrate to a temperature equal to or above the temperature at which the first thermoplastic resin swollen with the liquid solvent composition, that is, the first area on the surface of the substrate, adheres to the foiling material. In some examples, the foil printing device heats the substrate to a temperature below the temperature at which the foiling material adheres to the second area of the surface of the substrate.

In some examples, the foil printing device comprises a temperature controller to control the temperature to which the substrate is heated on passing through the foil printing device. In some examples, the temperature controller is configured to gradually increase the temperature of the substrate to a temperature at which the foiling material adheres to the first area. In some examples, the temperature controller is configured to gradually increase the temperature of the substrate to a temperature at which the foiling material adheres to the first area without reaching a temperature at which the foiling material adheres to the second area.

In some examples, pressure is applied to the substrate as the substrate passes through the foil printing device in order to promote adhesion of the foiling material to the first area.

In some examples, the foil printing device comprises a pressure controller to control the pressure applied to the substrate as the substrate passes through the foil printing device.

In some examples, the foil printing device comprises a plurality rollers for heating and applying pressure to the substrate and foiling material to enable the foiling material to adhere to the first area of the surface of the substrate.

In some examples, the plurality of rollers is made up of pairs of rollers and the device is configured to pass the substrate between each of the pairs of rollers.

In some examples, at least one of the plurality of rollers of the foil printing device is heatable. In some examples, each of the plurality of rollers of the foil printing device is heatable.

In some examples, the foil printing device comprises a temperature controller configured to independently control the temperature of each of the plurality of rollers to allow the temperature of the substrate to be gradually raised as the substrate passes through the foil printing device. In some examples, the temperature controller is configured to independently control the temperature of each pair of the plurality of rollers.

In some examples, the temperature controller is configured to independently control the temperature of each of the plurality of rollers or of each of the pairs of the plurality of rollers such that, in use, the temperature of the substrate is gradually increased towards the temperature at which the foiling material adheres to the first area as the substrate passes through the foil printing device.

In some examples, the temperature controller is configured to prevent the temperature of the substrate from reaching a temperature at which the foiling material adheres to the second area.

In some examples, the temperature controller is configured to ensure that the maximum temperature reached by the substrate, the first electrostatic ink composition printed on the first area and the second electrostatic ink composition printed on the second area is not sufficient to cause the foiling material to adhere to the second area.

In some examples, the temperature controller is configured to control the temperature of each of the plurality of rollers or pairs of the plurality of rollers such that, in use, a first roller or a first pair of rollers has a lower temperature than a second roller or a second pair of rollers and the second roller or the second pair of rollers has a lower temperature than a third roller or third pair of rollers and so on until a roller or pair of rollers having a temperature sufficient to adhere the foiling material to the first area is reached.

In some examples, the temperature controller is configured to control the temperature of the plurality of rollers or pairs of rollers to decrease the temperature of each roller or pair of rollers moving towards the substrate output station.

In some examples, the temperature controller is configured to control the temperature of the plurality of rollers or pairs of rollers to firstly increase the temperature of the substrate as the substrate passes through the foil printing device until a temperature at which the foiling material adheres to the first area is reached and then to decrease the temperature of the substrate as the substrate continues to pass through the foil printing device to the substrate output station.

In some examples, the foil printing device comprises a foiling material feed to supply a foiling material to the substrate as the substrate passes through the foil printing device for applying a foiling material to the first area of the surface of the substrate to form a foiled first area. In some examples, a carrier layer is attached to a surface of the foiling material and, on contact of the foiling material with the first area of the surface of the substrate, the foiling material is transferred from the carrier layer to the first area of the surface of the substrate to form a foiled first area.

In some examples, a foiling material feed supplies a foiling material to the plurality of rollers such that, in use, the foiling material contacts the substrate as the substrate passes through the plurality of rollers.

In some examples, the foil printing device comprises a foiling material extractor to remove un-adhered foiling material from the foil printing device. In some examples, the foil printing device comprises a separator element to separate the un-adhered foiling material from the foiled first area of the substrate.

FIG. 1 shows a schematic illustration of a liquid electrostatic printing and foiling system. An image, including any combination of graphics, text and images, may be communicated to the liquid electrostatic printing apparatus 1. According to an illustrative example, firstly, the photo charging unit 2 deposits a uniform static charge on the photo-imaging cylinder 4 and then a laser imaging portion 3 of the photo charging unit 2 dissipates the static charges in selected portions of the photo-imaging cylinder 4 to leave a latent electrostatic image. The latent electrostatic image is an electrostatic charge pattern representing the image to be printed. The electrostatic ink composition is then transferred to the photo-imaging cylinder 4 by Binary Ink Developer (BID) units 6. The BID units 6 present a uniform film of the liquid electrostatic ink composition comprising a carrier liquid to the photo-imaging cylinder 4. The liquid electrostatic ink composition contains an electrically charged resin component which, by virtue of an appropriate potential on the electrostatic image areas, is attracted to the latent electrostatic image on the photo-imaging cylinder 4 (first transfer). The electrostatic ink composition does not adhere to the uncharged, non-image areas and forms an image on the surface of the latent electrostatic image. The photo-imaging cylinder 4 then has a first electrostatic ink composition or a second electrostatic ink composition on its surface.

The electrostatic ink composition is then transferred from the photo-imaging cylinder 4 to the intermediate transfer member (ITM) 8 by virtue of an appropriate potential applied between the photo-imaging cylinder 4 and the ITM 8, such that the charged electrostatic ink composition is attracted to the ITM 8 (second transfer). The image is then dried and fused on the ITM 8 before being transferred to a substrate 10 fed to the ITM 8 from a substrate input station 12.

Between the first and second transfers the solid content of the electrostatic ink composition is increased and the concentrated composition is fused on to the ITM 8. For example, the solid content of the electrostatic ink composition deposited on the ITM 8 after the first transfer is typically around 20%, by the second transfer the solid content of the image is typically around 80-90%. This drying and fusing is typically achieved by using elevated temperatures and air flow assisted drying. In some examples, the ITM 8 is heatable.

In some examples, at least one of the BID units 6 of the electrostatic printing and foiling system 1 comprises a toner reservoir containing a first electrostatic ink composition comprising a first thermoplastic resin and substantially lacking a pigment, and at least one of the other BID units 6 of the electrostatic printing and foiling system comprises a toner reservoir containing a second electrostatic ink composition comprising a second thermoplastic resin and a pigment.

In some examples, after forming a first latent electrostatic image on the surface of the photoconductive member, for example, the photo-imaging cylinder 4, the surface of the photoconductive member is contacted with the first electrostatic ink composition to form a first image portion on the surface of the latent electrostatic image. The first image portion is then transferred from the surface of the photo-imaging cylinder 4 to the ITM 8. A second latent electrostatic image is then formed on the surface of the photo-imaging cylinder 4 and a second electrostatic ink composition is then contacted with the surface of the photo-imaging cylinder 4 to form a second image portion. The second image portion is then transferred from the surface of the photo-imaging cylinder 4 to the ITM 8 to form a second image portion disposed on the ITM 8 before transfer of the first and second electrostatic image portions, that is, the first and second electrostatic ink compositions (in a concentrated form), from the surface of the ITM 8 to the substrate 10 to provide a substrate 10 on which the first and second electrostatic inks are disposed such that the second electrostatic ink composition is on at least the second area of the surface of the substrate and the first electrostatic ink composition is on the first area of the surface of the substrate. In some examples, the second electrostatic ink composition is also on the first area on surface of the substrate, in which case the first electrostatic ink composition is disposed on the second electrostatic ink composition on the first area of the surface of the substrate.

In some examples, a plurality of second electrostatic ink compositions may be printed, for example, different coloured second electrostatic ink compositions. In such examples, the substrate 10 produced comprises a plurality of coloured second electrostatic ink compositions disposed on at least the second area of the surface of the substrate and a first electrostatic ink composition disposed on the first area of the surface of the substrate.

In some examples, after forming the latent electrostatic image on the surface of the photoconductive member, for example, the photo-imaging cylinder 4, the surface of the photoconductive member is contacted with the second electrostatic ink composition on at least a second image portion of the surface of the photoconductive member, that is, the latent electrostatic image. In this example, the second electrostatic ink composition is then transferred to at least the second area on the surface of the substrate 10 (for example, via the ITM 8) before a further latent electrostatic image is formed on the surface of the photoconductive member, for example, the photo-imaging cylinder 4. The surface of the photoconductive member is then contacted with the first electrostatic ink composition on a first image portion of the surface of the photoconductive member that is, the further latent electrostatic image. The first electrostatic ink composition is then transferred to the substrate 10 such that the first electrostatic ink composition is disposed on the first area on the surface of the substrate. In some examples, the second electrostatic ink composition may also be contacted with the first area on the surface of the substrate, in which situation the first electrostatic ink is disposed on the second electrostatic ink on the first area of the surface of the substrate.

In some examples, a plurality of second electrostatic ink compositions may be used to form the second area, for example, different coloured second electrostatic ink compositions, and transferred to the substrate 10 one by one before the first electrostatic ink composition is used and transferred to the first area on the surface of the substrate.

After formation of the substrate comprising first and second electrostatic ink compositions printed thereon in a first and \second area, the substrate 10 is transferred through a liquid solvent application component, such as a flood coater 32, 34, which applies the liquid solvent composition to the first electrostatic ink composition on the first area and the second electrostatic ink composition on the second area, swelling the first and second thermoplastic resins.

After the liquid solvent composition is applied to the first electrostatic ink composition on the first area and the second electrostatic ink composition on the second area, the substrate 10 is transferred through a foil printing device 14 to the substrate output station 16. In some examples, in the foil printing device 14, the first electrostatic ink composition becomes adhesive without the second electrostatic ink composition becoming adhesive. In some examples, in the foil printing device 14, the first electrostatic ink composition is at least partially melted without melting the second electrostatic ink composition.

In some examples, the substrate 10 is heated in the foil printing device 14 to cause the first electrostatic ink composition to become adhesive without the second electrostatic ink composition becoming adhesive. In some examples, the foil printing device comprises a plurality of heatable rollers 18 to heat the substrate and cause the first electrostatic ink composition to become adhesive without the second electrostatic ink composition becoming adhesive. In some examples, the substrate 10 is heated in the foil printing device 14 to at least partially melt the first electrostatic ink composition without melting the second electrostatic ink composition. In some examples, the foil printing device comprises a plurality of heatable rollers 18 to heat the substrate and at least partially melt the first electrostatic ink composition without melting the second electrostatic ink composition. In some examples, the foil printing device comprises a temperature controller 20 configured to independently control the temperature of each of the plurality of rollers 18. In some examples, the plurality of rollers 18 comprise a plurality of pairs of rollers 18a, 18b, 18c. In some examples, the temperature controller 20 is configured to independently control the temperature of each of the plurality of pairs of rollers 18a, 18b, 18c.

In some examples, the foil printing device 14 comprises a pre-heater 22 for heating the substrate 10 before the substrate passes through the plurality of heatable rollers 18.

In some examples, the temperature controller 20 is configured to control the temperature of the plurality of rollers 18 such that a first pair of rollers 18a has a lower temperature than a second pair of rollers 18b and such that the first pair of rollers 18a and the second pair of rollers 18b has a lower temperature than a third pair of rollers 18c to allow for gradual heating of the substrate 10 to cause the first electrostatic ink composition to become adhesive. In some examples, the temperature controller 20 is configured to control the temperature of the plurality of rollers 18 such that a first pair of rollers 18a has a lower temperature than a second pair of rollers 18b and such that the first pair of rollers 18a and the second pair of rollers 18b has a lower temperature than a third pair of rollers 18c to allow for gradual heating of the substrate 10 to at least partially melt the first electrostatic ink composition.

In some examples, the temperature controller 20 is configured to ensure that the maximum temperature of any of the plurality of rollers 18 is not sufficient to cause the second electrostatic ink composition to become adhesive. In some examples, the temperature controller 20 is configured to ensure that the maximum temperature of any of the plurality of rollers 18 is not sufficient to cause melting or partial melting of the second electrostatic ink composition.

In some examples, the temperature controller 20 is configured to control the temperature of the plurality of rollers 18 such that a first pair of rollers 18a has a lower temperature than a second pair of rollers 18b and such that a third pair of rollers 18c has a lower temperature than the second pair of rollers 18c to allow for the gradual heating of the substrate 10 to cause the first electrostatic ink composition to become adhesive and allow for gradual cooling of the substrate 10. In some examples, the temperature controller 20 is configured to control the temperature of the plurality of rollers 18 such that a first pair of rollers 18a has a lower temperature than a second pair of rollers 18b and such that a third pair of rollers 18c has a lower temperature than the second pair of rollers 18c to allow for the gradual heating of the substrate 10 to at least partially melt the first electrostatic ink composition and allow for gradual cooling of the substrate 10.

In some examples, the foil printing device comprises a pressure controller 20 for controlling the pressure exerted by the plurality of rollers 18 on the substrate as the substrate 10 passes through the foil printing device.

According to an example, the foil printing device comprises a foiling material feed 24 for feeding a foiling material on which a carrier layer may be disposed 26 through the foil printing station such that, in use, the foiling material 26 is contacted with the substrate 10 as the substrate 10 passes through the foil printing device. The carrier layer disposed on the foiling material allows the plurality of rollers 18 to apply pressure to the substrate 10 without the rollers 18 contacting the foiling material or the substrate 10 during formation of a foiled image.

The carrier layer may be removed from the foil printing device by a carrier layer extractor 28. In some examples, the foil printing device comprises a separator element 30 to aid separation of the carrier layer from the substrate 10 as the substrate 10 comprising a foiled image exits the foil printing device.

EXAMPLES

The following illustrates examples of the methods and other aspects described herein. Thus, these examples should not be considered as limitations of the present disclosure, but are merely in place to teach how to make examples of the present disclosure.

Materials

Thermoplastic Resins

Nucrel® 699 (available from DuPont): a copolymer of ethylene and methacrylic acid, made with nominally 11 wt. % methacrylic acid.

AC-5120 (available from Honeywell): a copolymer of ethylene and acrylic acid with an acid number of 112-130 KOH/g.

Nucrel® 599 (available from DuPont): a copolymer of ethylene and methacrylic acid, made with nominally 10 wt. % methacrylic acid.

Elvax 250 (available from DuPont): a copolymer of ethylene and vinyl acetate made with nominally with 28 wt. % vinyl acetate.

Lotader 3430 (available from Arkema): a random terpolymer of ethylene, methyl acrylate and maleic anhydride, made with nominally 15 wt. % methyl acrylate and 3.1 wt. % maleic anhydride.

Additives

Finawax E (available from fine organics): a refined vegetable oil based composition comprising erucamide used as a slip agent and an anti-blocking agent.

Charge Adjuvant

VCA (available from Sigma-Aldrich): an aluminium stearate.

Charge Director

NCD: a natural charge director having the components (i) natural soya lecithin, (ii) basic barium petronate, and (iii) dodecyl benzene sulfonic acid, amine salt, with the components (i), (ii) and (iii) being present in the weight ratios of 6.6%:9.8%:3.6%.

Pigment

Cyan: a mixture of C.I.P.B. 15:3 No. 74160, resin coated (CAS number 000147-14-8) and C.I.P.G. 7 No. 74260, resin coated (CAS 001328-53-6).

Carrier Liquids and Liquid Solvent Compositions

Isopar L (available from Exxon Mobil): an isoparaffinic oil comprising a mixture of C11-C13 isoalkanes. This mixture typically has an initial boiling point (IBP) of 170° C. and a final boiling point (FBP) of 250° C. as measured by ASTM D 86.

Isopar V (available from Exxon Mobil): an isoparaffinic oil comprising a mixture of C14-C19 isoalkanes. This mixture typically has an initial boiling point (IBP) of 229*° C. and a final boiling point (FBP) of 355° C. as measured by ASTM D 86.

Foiling Material

GMP Gold (SN-211800024; available from GMP): a 25 µm gold coloured metallic foil layer with a plastic backing carrier layer and an adhesive layer.

Transparent Ink A (First Electrostatic Ink Composition)

This ink is available under the name Transparent ElectroInk 4.5 from HP Indigo. It contains particles comprising the resins Nucrel® 699 and AC-5120 (ratio of 4:1) in a carrier liquid (Isopar L). The ink lacks a pigment.

The ink was formed in a process that involves mixing the resins in Isopar L at 25 wt. % non-volatile solids (NVS) in a Ross mixer (Model DPM-2, obtained from Charles Ross & Son Company-Hauppauge NY) at room temperature and 270 rpm for 24 h to obtain a paste.

The paste was then added to a ceramic attritor (S0 from Union Process, USA) and diluted with carrier liquid (Isopar L) to and then 1-5 wt. % (of the solids) charge adjuvant (VCA) was added. The material was then ground in the attritor 25° C. and 270 rpm for 24 h to incorporate the VCA into particles comprising the resins that are suspended in the Isopar L, and further reduce the size of these particles.

The ground material was then diluted with carrier liquid (Isopar L) to form a 2 wt. % NVS composition and a charge director (0.1 wt. % to 0.3 wt. % of the solids of the ink) was added to form transparent ink A.

Cyan Ink (Second Electrostatic Ink Composition)

The cyan ink used in the Examples is available under the name Cyan ElectroInk 4.0 from HP Indigo. It contains, inter alia, Nucrel®699 and AC-5120 (ratio of 4:1) as the resins, cyan pigment, VCA, Isopar L and NCD and has a non-volatile solids content of 2 wt. %.

Example 1

Cyan Ink (second electrostatic ink composition) was printed at 100% coverage onto Condat (300 g) paper with an Indigo 7600 series LEP printing press to cover both the first and second areas of the surface of the substrate. Transparent ink A (first electrostatic ink composition) was selectively printed at 200% coverage on top of a portion of the cyan ink to cover the first area of the surface of the substrate. Thus, the substrate has a surface comprising a first area and a second area. The first area has printed thereon a second electrostatic ink composition (cyan ink) and, on top of the second electrostatic ink composition, a first electrostatic ink composition (transparent ink A). The second area has printed thereon only a second electrostatic ink composition.

The printed substrate was loaded into the substrate tray of an Epson L130 (5760 dpi) inkjet printer. The printer ink tank was charged with a liquid solvent composition, in this case, a mixture of Isopar L and Isopar V (ratio of 1:1). This liquid solvent composition was applied over the entire surface of the substrate to form a film. The printed substrate was then immediately fed into a foil printing device (a GMP EXCELAM PLUS 355RM laminator) in which a metallic foiling material (metallic gold available from GMP) was brought into contact with the first and second electrostatic ink compositions. The combined substrate and metallic foil layers were passed through the heated nip of the foil printing device at a speed of 3.2 m/min and a pressure of about 1 kg/m² at a variety of temperatures to determine the most suitable temperature range to use for each electrostatic ink combination (see table below for details). After cooling for several seconds, the foil carrier layer was removed and the percentage of foil adhered to the transparent ink composition (first electrostatic ink composition) was determined visually, that is, the percentage of foil adhered in the desired positions (first area) on the substrate. The background contamination by foil, that is, the amount of foil adhered to is the second electrostatic ink composition, in positions in which no transparent ink composition (first electrostatic ink composition) was applied, was examined. This process was repeated on several printed substrates with different coverages of liquid solvent composition.

Best results were obtained for 25-45% coverage of the liquid solvent composition, which corresponds to a coat weight of 0.5-0.75 g/m².

Transparent Ink B

Transparent Ink B was prepared by following the procedure used for Transparent Ink A but using Nucrel® 599 as the resin at 25 wt. % NVS. The grinding was performed for 149.7 g of paste at 25 wt. % solids in Isopar L in the presence of 0.57 g of aluminium monostearate as a grinding agent.

Example 2

The selective foiling process was performed as described in Example 1 by using Transparent Ink B at 200% coverage instead of Transparent Ink A. Best results were obtained for a coat weight of the liquid solvent composition of 0.5-0.7 g/m².

Transparent Ink C

Transparent Ink C was prepared by following the procedure used for Transparent Ink A but with a paste with 25 wt. % solids and the grinding was performed on 28.12 g of paste combined with 108.6 g of a paste prepared from Elvax 250 and Isopar L (28 wt. % solids mixture) and in the presence of 0.57 g of aluminium monostearate as a grinding agent.

Example 3

The selective foiling process was performed as described in Example 1 by using Transparent Ink C at 200% coverage instead of Transparent Ink A. Best results were obtained for a coat weight of the liquid solvent composition of 0.7-1.0 g/m².

Transparent Ink D

Transparent Ink D was prepared by mixing Lotader 3430 resin with Isopar L to form a 17 wt. % NVS paste. The paste (220 g) was then ground in the presence of aluminium monostearate (0.57 g) as a grinding agent and diluted to 2 wt % NVS. A charge director (0.1 wt. % to 0.3 wt. %, NCD) was added to form the ink.

Example 4

The selective foiling process was performed as described in Example 1 by using Transparent Ink D at 200% coverage instead of Transparent Ink A. Best results were obtained for a coat weight of the liquid solvent composition of 0.5-0.7 g/m².

Transparent Ink E

Transparent Ink E was prepared by diluting the paste formed for Transparent Ink A to 19 wt. % NVS in Isopar L and mixing this paste (140 g) with a paste (4.4 g) formed by mixing Finawax E with Isopar L (34.8 wt. % NVS) at room temperature for 0.5 h. The paste was then mixed and diluted to 2 wt. % NVS. A charge director (0.1 wt. % to 0.3 w.% mg/g, NCD) was added to form the ink.

Example 5

The selective foiling process was performed as described in Example 1 by using Transparent Ink E at 200% coverage instead of Transparent Ink A. Best results were obtained for a coat weight of the liquid solvent composition of 0.5-0.7 g/m².

Analysis of Examples 1-5

The temperatures at which the foiling material adheres to each of the above described first and second electrostatic ink compositions and the first and second electrostatic inks onto which a liquid solvent composition has been applied (Isopar L and Isopar V (1:1)) was assessed.

Two different temperatures were found to be relevant. $T_0$ is the temperature at which the foiling material starts to adhere to the composition and T is the temperature at which the foiling material completely adheres to the composition. These temperatures were determined for foil application to the electrostatic ink compositions ($T_0$ and T in the table below) and for foil application to the electrostatic ink compositions onto which a liquid solvent composition (Isopar L and Isopar V (1:1)) had been applied, causing swelling of the thermoplastic resins ($T_{0(Isopar)}$ and $T_{(Isopar)}$ in the table below). ΔT provides the difference in temperature between the foil material adhering completely to the first electrostatic ink composition (T) and the foil material starting to adhere to the second electrostatic ink composition ($T_{0(background)}$).

$T_0$ and T temperatures were determined by using an IR optic sensor in the foil printing device to measure the temperature during foiling (accuracy of ±2-3° C.). $T_0$ is the temperature that was measured by the IR optic sensor when 3-5% of the foil material adhered to the ink composition (determined visually). T is the temperature that was measured by the IR optic sensor when 100% of the foil material adhered to the ink composition (determined visually). The values for $T_0$ and T are provided in the table below.

| | 1 | 2 | 3 | 4 | 5 | Cyan Ink Background (second electrostatic ink composition) |
|---|---|---|---|---|---|---|
| $T_0$ | 115 | 115 | 110 | 110 | 100 | 120 |
| T | 120 | 120 | 120 | 115 | 115 | 130 |
| ΔT = $T_{0(background)}$ − T | 0 | 0 | 0 | 5 | 5 | — |
| $T_{0(Isopar)}$ | 110 | 100 | 95 | 100 | 105 | 115 |
| $T_{(Isopar)}$ | 115 | 105 | 105 | 105 | 110 | 120 |
| ΔT = $T_{0(background; Isopar)}$ − $T_{(Isopar)}$ | 0 | 10 | 10 | 10 | 5 | — |
| Best Isopar coat weight range [g/m²] | 0.5-0.7 | 0.5-0.7 | 0.7-1.0 | 0.5-0.7 | 0.5-0.7 | <0.5 |

| | Resin compositions and other differences |
|---|---|
| 1 | Nucrel 699 and AC-5120 (4:1) |
| 2 | Nucrel 599 |
| 3 | Nucrel 699, AC-5120 and Elvax 250 (4:1:20) |
| 4 | Lotader 3430 |

-continued

| | Resin compositions and other differences |
|---|---|
| 5 | Nucrel 699 and AC-5120 (4:1; 95 wt. %) and Finawax E (5 wt. %) |
| Cyan Ink Background | Nucrel 699 and AC-5120 (4:1) and cyan pigment |

While the method and related aspects have been described with reference to certain examples, those skilled in the art will appreciate that various modifications, changes, omissions, and substitutions can be made without departing from the spirit of the disclosure. It is intended, therefore, that the method and related aspects be limited by the scope of the following claims. The features of any dependent claim can be combined with the features of any of the other dependent claims, and any independent claim.

The invention claimed is:

1. A method of foil printing, the method comprising:
providing a substrate having a surface comprising a first area and a second area, wherein the first area has printed thereon a first electrostatic ink composition comprising a first thermoplastic resin and substantially lacking a pigment and the second area has printed thereon a second electrostatic ink composition comprising a second thermoplastic resin and a pigment;
applying a liquid solvent composition to the first electrostatic ink composition on the first area and the second electrostatic ink composition on the second area, to swell the first and second thermoplastic resins; and
contacting a foiling material with the first electrostatic ink composition on the first area, such that the foiling material selectively adheres to the first area on the surface of the substrate.

2. The method according to claim 1, wherein the liquid solvent composition is applied in an amount sufficient to form a coat weight of 5 g/m² or less on the surface of the substrate.

3. The method according to claim 1, wherein the liquid solvent composition is applied in an amount sufficient to form a coat weight of 0.1 g/m² to 5 g/m² on the surface of the substrate.

4. The method according to claim 1, wherein the liquid solvent composition consists essentially of a solvent.

5. The method according to claim 1, wherein the liquid solvent composition comprises a solvent selected from the group consisting of a mineral oil, a hydrocarbon, a silicone oil, and a vegetable oil.

6. The method according to claim 1, wherein the liquid solvent composition comprises a hydrocarbon.

7. The method according to claim 6, wherein the hydrocarbon is selected from the group consisting of aliphatic hydrocarbons, isomerized aliphatic hydrocarbons, branched chain aliphatic hydrocarbons, aromatic hydrocarbons, and combinations thereof.

8. The method according to claim 1, wherein the application of the liquid solvent composition to the first electrostatic ink composition on the first area and the second electrostatic ink composition on the second area is achieved by using a technique selected from the group consisting of air knife coating, anilox coating, brush coating, flexography, gravure printing, metering rod coating, pad printing, rod coating, roller coating, slot die coating, spin coating, spray coating, dip coating, screen printing, and inkjet printing.

9. The method according to claim 1, wherein contacting the foiling material with the first electrostatic ink composition on the first area, such that the foiling material selectively adheres to the first area on the surface of the substrate, is carried out by a hot foiling technique.

10. The method according to claim 9, wherein the hot foiling technique is performed at a temperature that causes the first thermoplastic resin swollen with the liquid solvent composition to become adhesive without causing the second thermoplastic resin swollen with the liquid solvent composition to become adhesive.

11. The method according to claim 9, wherein the hot foiling technique is performed at 90° C. to 120° C.

12. The method according to claim 1, wherein (a) the first thermoplastic resin and/or second thermoplastic resin is/are selected from the group consisting of (i) a copolymer of an alkylene monomer and a monomer selected from acrylic acid and methacrylic acid, (ii) an ethylenevinyl acetate copolymer, and (iii) a terpolymer of ethylene, an acrylic ester and maleic anhydride, and/or (b) the first thermoplastic resin is different from the second thermoplastic resin.

13. The method according to claim 1, wherein the first area has printed thereon the second electrostatic ink composition under the first electrostatic ink composition, wherein the first electrostatic ink composition forms the surface onto which the liquid solvent composition is applied and to which the foiling material is contacted.

14. The method according to claim 1, wherein the first electrostatic ink composition lacks a pigment.

* * * * *